United States Patent
Izumi

(10) Patent No.: US 7,473,447 B2
(45) Date of Patent: Jan. 6, 2009

(54) LIQUID CRYSTAL DISPLAY DEVICE AND MANUFACTURING METHOD THEREOF

(75) Inventor: Tomoo Izumi, Toyonaka (JP)

(73) Assignee: Konica Minolta Holdings, Inc., Tokyo (JP)

( * ) Notice: Subject to any disclaimer, the term of this patent is extended or adjusted under 35 U.S.C. 154(b) by 182 days.

(21) Appl. No.: 11/093,549

(22) Filed: Mar. 29, 2005

(65) Prior Publication Data

US 2005/0218376 A1    Oct. 6, 2005

(30) Foreign Application Priority Data

| Mar. 31, 2004 | (JP) | ............................. 2004-102180 |
| Jan. 26, 2005 | (JP) | ............................. 2005-018537 |

(51) Int. Cl.
  *C09K 19/36*  (2006.01)
  *C09K 19/54*  (2006.01)
  *C09K 19/52*  (2006.01)

(52) U.S. Cl. .................. 428/1.1; 428/1.3; 252/299.01; 252/299.5; 252/299.7; 349/176; 349/185

(58) Field of Classification Search ................. 428/1.1, 428/1.3; 252/299.01, 299.5, 299.7; 349/176, 349/185

See application file for complete search history.

(56) References Cited

U.S. PATENT DOCUMENTS

| 6,074,710 | A | 6/2000 | Kato et al. ................... 428/1.5 |
| 6,278,505 | B1 | 8/2001 | Okada et al. ................... 349/78 |
| 6,404,471 | B1 * | 6/2002 | Hatanaka et al. ............. 349/113 |
| 6,645,577 | B2 * | 11/2003 | Horikiri ....................... 428/1.1 |
| 6,682,787 | B2 * | 1/2004 | Kato et al. ................... 428/1.5 |
| 6,913,709 | B2 * | 7/2005 | Harada et al. ........... 252/299.01 |
| 2003/0053015 | A1 * | 3/2003 | Minoura et al. ............. 349/113 |
| 2003/0222242 | A1 * | 12/2003 | Harada et al. ............ 252/299.5 |
| 2006/0163535 | A1 * | 7/2006 | Izumi ...................... 252/299.7 |

OTHER PUBLICATIONS

R. Q. Ma et al, "9.2 Polymer-Stabilized Bistable Black-White Cholesteric Reflective Display", SID 97 Digest, 1997, pp. 101-104.

* cited by examiner

*Primary Examiner*—Shean C Wu
(74) *Attorney, Agent, or Firm*—Sidley Austin LLP

(57) ABSTRACT

A liquid crystal display device, comprising:

a liquid crystal layer comprising a cholesteric liquid crystal and a self-organizing type gelling agent, and a manufacturing method thereof, comprising: spreading a cholesteric liquid crystal containing a gelling agent in a heated state over at least one of substrates to form a liquid crystal layer, or a manufacturing method thereof, comprising: spreading a cholesteric liquid crystal that contains a gelling agent and exhibits flowability at room temperature over at least one of substrates to form a liquid crystal layer.

8 Claims, 14 Drawing Sheets

LIQUID CRYSTAL DISPLAY DEVICE AND MANUFACTURING METHOD THEREOF

This application is based on applications No. 2004-102180 and 2005-018537 filed in Japan, the contents of which are hereby incorporated by reference.

BACKGROUND OF THE INVENTION

1. Field of the Invention

The present invention relates to a liquid crystal display device and a manufacturing method thereof.

2. Description of the Related Art

Conventionally, a liquid crystal display device, which uses a chiral nematic composition that is made to exhibit a cholesteric phase at room temperature by applying a chiral agent to a nematic liquid crystal, has been known. Such a liquid crystal display device basically has a structure in which a chiral nematic liquid crystal composition is sandwiched between a pair of substrates having transparent electrodes. A high or low pulse voltage (driving voltage) is applied between the electrodes to switch the liquid crystal between a planar (PL) state and a focal conic (FC) state or a homeotropic state so as to carry out a displaying operation. In particular, in the PL state, light having a specific peak wavelength is selectively reflected.

In such a display device, in an attempt to carry out a black and white display and a wide-viewing-angle display, a technique has been proposed in which: a monomer and a polymerization initiator are contained in the nematic liquid crystal composition and after the display device has been once manufactured, the display device is subjected to an ultraviolet-ray (UV) irradiation or the like so that the polymer is polymerized (for example, Non-Patent Document 1).

[Non-Patent Document 1] "SID 97 DIGEST", p. 101 to 104, written by R. Q. Ma and one other.

In the above-mentioned technique, however, even when a polymerizing process is carried out sufficiently, it is not possible to completely carry out the polymerizing process so as not to cause residual unreacted monomers; therefore, upon use of the device, the residual unreacted monomers gradually react to ultraviolet rays to cause a problem in that the device is changed in its display performance. In other words, the display color is changed, and the contrast is lowered between the PL state and the FC state or the Homeo state. In particular, in the case when a black and while display system that displays white in the PL state, and displays black in the FC state or the Homeo state is carried out, the above-mentioned problem becomes prominent.

With respect to the method for improving the contrast, a method, which improves a whiteness degree at the time of displaying white by increasing the reflectance in a comparatively wide wavelength in the PL state, has been known. In such a method, however, it is difficult to select a proper material used for increasing the reflectance in the comparatively wide wavelength in the PL state, and it is necessary to increase the cell gap so as to increase the reflectance in the wide wavelength, with the result that another problem is raised from the viewpoint of a driving voltage.

BRIEF SUMMARY OF THE INVENTION

The present invention is to provide a liquid crystal display device which can provide a superior black and white display for a long time, and also maintain the initial display color and a high contrast.

The present invention is also to provide a production method of the new and useful liquid crystal display device.

The present invention relates to a liquid crystal display device, comprising:

a liquid crystal layer comprising a cholesteric liquid crystal and a self-organizing type gelling agent, and a manufacturing method thereof, comprising: spreading a cholesteric liquid crystal containing a gelling agent in a heated state over at least one of substrates to form a liquid crystal layer, or a manufacturing method thereof, comprising: spreading a cholesteric liquid crystal that contains a gelling agent and exhibits flowability at room temperature over at least one of substrates to form a liquid crystal layer.

DETAILED DESCRIPTION OF THE INVENTION

The present invention relates to a liquid crystal display device, comprising: a liquid crystal layer comprising a cholesteric liquid crystal and a self-organizing type gelling agent.

The present invention also relates to a manufacturing method for a liquid crystal display device in which a cholesteric liquid crystal containing a self-organizing type gelling agent in a heated state is spread over at least one of substrates to form a liquid crystal layer.

The present invention also relates to a manufacturing method for a liquid crystal display device in which a cholesteric liquid crystal in a non-heated state, which contains a gelling agent and exhibits flowability at room temperature, is spread over at least one of substrates to form a liquid crystal layer.

The liquid crystal display device of the present invention makes it possible to provide a superior black and white display for a long time, and also to maintain the initial display color and a superior contrast. The manufacturing method for a liquid crystal display of the present invention makes it possible to easily manufacture a liquid crystal display device in a short time.

Figure 1:
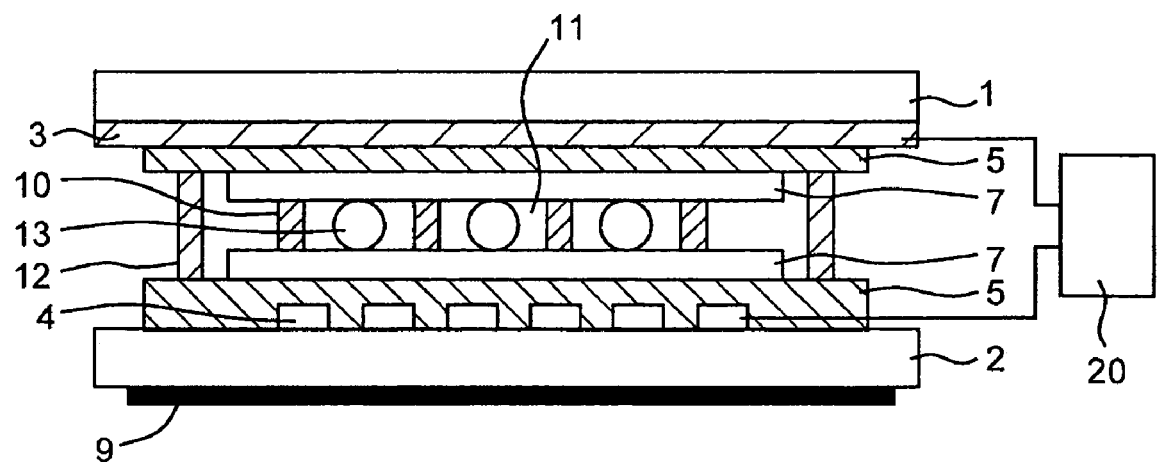
FIG. 1 is a schematic cross-sectional view that shows one example of a liquid crystal display device in accordance with an embodiment of the present invention.

FIG. 1 is a schematic drawing that shows a cross-sectional structure of a liquid crystal display device that is one embodiment of the present invention. The liquid crystal display device, shown in FIG. 1, has a structure in which a liquid crystal layer (liquid crystal composition) 11 is sandwiched between a pair of substrates 1 and 2. In FIG. 1, transparent electrodes 3 and 4, each having a pattern including a plurality of stripes aligned in parallel with one another, are formed on the respective surfaces of the substrates 1 and 2. The transparent electrode 3 and the transparent electrode 4 are aligned face to face with each other so as to intersect with each other. Each of the transparent electrodes 3 and 4 is coated with an insulating thin film 5. An orientation film 7 is formed on the insulating thin film 5. Reference numeral 10 represents a polymer structure serving as both a space retaining member and an adhesive member of both the substrates, and reference numeral 13 represents a spacer that also serves as a space retaining member. Reference numeral 12 represents a sealant that is used for enclosing the liquid crystal composition 11 in a cell. A black-colored visible-light absorbing layer 9 is formed on an outer face (rear face) of the substrate 2 on the side opposite to the light-incident side, if necessary. Instead of forming the visible-light absorbing layer 9, the substrate 2 itself may have a visible-light absorbing property.

The following description explains main constituent members of the liquid crystal display device.

(Substrate)

In FIG. 1, both of the substrates 1 and 2 have a light-transmitting property; however, with respect to the pair of substrates to be used in the above-mentioned liquid crystal display device, at least one of the substrates (at least the substrate 1 on the light-incident side) may have a light-transmitting property. With respect to the substrate having a light-transmitting property, a glass substrate as well as a flexible substrate formed by resin, such as polycarbonate, polyether sulfone, polyallylate and polyethylene terephthalate, may be used. From the viewpoint of preparing a light-weight device, the flexible substrate is preferably used. When the flexible substrate is used as at least one of the paired substrates or, preferably, as both of the substrates, it becomes possible to manufacture a thin light-weight device, and also to prevent breakage (cracks) in the device.

(Electrode)

With respect to the electrodes 3 and 4, for example, a transparent conductive film such as ITO (Indium Tin Oxide) and IZO (Indium Zinc Oxide), a metal electrode such as aluminum or silicon, a photoconductive film such as amorphous silicon and BSO (Bismuth Silicon Oxide), may be used. In the liquid crystal display device shown in FIG. 1, as described above, transparent electrodes 3 and 4, each having a pattern including a plurality of stripes aligned in parallel with one another, are formed on the respective surfaces of the transparent substrates 1 and 2, and these electrodes 3 and 4 are aligned face to face with each other in a manner so as to intersect each other. In order to form the electrodes in this structure, for example, an ITO layer may be mask-vapor-deposited on the substrate by using a sputtering method, or after forming an ITO layer over the entire surface, a patterning process may be carried out thereon by using a photolithography method.

(Insulating Thin Film)

Although not essentially required in principle, an insulating thin-film 5 is preferably formed on at least one of the electrodes 3 and 4 in order to prevent short-circuiting between the electrodes and also to improve the reliability of the gas-barrier property of the liquid crystal display device. With respect to the insulating thin film 5, examples thereof include: an inorganic film constituted by a material such as silicon oxide, titanium oxide, zirconium oxide and alkoxides thereof, and an organic film constituted by a material such as polyimide resin, epoxy resin, acrylic resin and urethane resin. By using these materials, the film can be formed through a known method, such as a vapor deposition method, a spin-coat method and a roll-coat method. The film may be formed by using the same material as a polymer resin to be used as the polymer structure.

(Orientation Film)

Although not essentially required in principle, an orientation film 7 is preferably formed so as to stabilize the device. Upon forming the orientation film, in the case when an insulating thin film is formed on the electrode, it is formed on the insulating thin film, and in the case when no insulating thin film is formed, it is formed on the electrode. With respect to the orientation film 7, examples thereof include: organic films such as polyimide resin, silicone resin, polyamideimide resin, polyetherimide resin, polyvinyl butyral resin and acrylic resin, and an inorganic film such as silicon oxide and aluminum oxide. The orientation film, formed by using these materials, may be subjected to a rubbing treatment and the like. Here, the orientation film may be formed by using the same material as a polymer resin to be used as the polymer structure.

(Spacer)

A spacer 13 is formed between the pair of substrates so as to uniformly maintain a gap between the substrates. With respect to the spacer, examples thereof include spherical bodies made of a resin or an inorganic oxide. For example, spherical glass and ceramic powder or spherical particles constituted by an organic material are proposed. A retention spacer the surface of which is coated with a thermoplastic resin may be preferably used. In order to maintain the gap between the substrates more uniformly, as shown in FIG. 1, both of the spacer 13 and the polymer structure 10 are preferably formed, or only either one of these may be formed. When the polymer structure is formed, the diameter of the spacer is preferably adjusted to a height shorter than its height, and when the device is completed, the diameter of the spacer becomes the same as that of the polymer structure. Although the polymer structure exists or not, the diameter of the spacer correspond to the thickness of the cell gap, that is, to the thickness of the liquid crystal layer formed of the liquid crystal composition.

(Liquid Crystal Layer)

A liquid crystal layer 11 contains a liquid crystal composition comprising a self-organizing type gelling agent and a cholesteric liquid crystal. In the present embodiment, the liquid crystal composition is prepared by adjusting the contents of components of the liquid crystal composition and the ratio of components so that the resulting liquid crystal composition exerts a peak wavelength of selective reflection in a range from 500 to 700 nm, particularly from 550 to 650 nm, in a spectral distribution curve (wavelength-reflectance curve) during the planar state of the resulting display device. When the peak wavelength of selective reflection is not in the above-mentioned range, that is, when the peak wavelength of selective reflection is leas than 500 nm, or exceeds 700 nm, the reflectance during the planar state is lowered, making it difficult to achieve a high contrast.

The peak refers to a convex portion at which, when the wavelength is increased from the short wavelength side in the spectral distribution curve, the gradient of the tangent of the curve turns from positive to negative, and the wavelength at the apex of the convex portion is defined as the peak wavelength.

The planar state refers to a state in which a pulse voltage that allows the device to exert the maximum reflectance in the peak wavelength of selective reflection is applied to the device, and the wavelength-reflectance curve, measured from the device at this time, is referred to as a spectral distribution curve in the planar state.

The peak wavelength of selective reflection is a wavelength at which the liquid crystal layer exhibits the maximum reflectance within a wavelength range of selective reflection, and in the case when only one peak is contained in the spectral distribution curve during the planar state, this peak wavelength corresponds to the peak wavelength of selective reflection. In the case when two or more peaks are contained, the peak wavelength which allows the maximum reflectance corresponds to the peak wavelength of selective reflection. The reason for this is because, in the case when a plurality of peaks are located (for example, there are a main peak in a range from 550 to 600 nm, a sub-peak in a range from 400 to 450 nm, and a third peak smaller than the main peak in a range from 500 to 550 nm), peaks having a small reflectance, which are mainly derived from scattering in the liquid crystal layer, appear in the short wavelength side.

In the present specification, the whiteness degree is evaluated by the distance on chromaticity coordinates that is obtained by the following method.

A spectral distribution curve is obtained from a display device in the planar state, and the chromaticity coordinates (x, y) are found from the spectral distribution curve so that the distance (d) from D65 standard (white: x=0.3127, y=0.329) is calculated. The distance (d) is a parameter that represents the whiteness, and as the distance becomes smaller, the whiteness degree becomes greater. In the present specification, the distance (d) is referred to as whiteness degree parameter.

The gelling agent to be used in the present embodiment is of the self-organizing type, and, when added and mixed, the gelling agent is capable of self-aligning to form a semi-network structure without using another means such as an UV irradiation or the like. By adding the self-organizing type gelling agent thereto, a cholesteric liquid crystal is lowered in its flowability in comparison with the state before the addition thereof so that the viscosity is increased. The liquid crystal display device of the present embodiment, which contains such a self-organizing type gelling agent, is allowed to provide a superior black and white display and maintain the initial display color and a superior contrast. Although mechanisms for exerting such effects have not been clarified in detail, it is considered that, since the gelling agent molecules are easily dispersed in a liquid crystal composition on a molecule basis to form a semi-network structure through hydrogen bonds, the network structure exerts a finer minuteness and an appropriate flexibility so that the above-mentioned effects are obtained. In comparison with a method in which the reflectance needs to be improved over a wide wavelength range, since this method does not require a thick cell gap, the driving process is carried out by using a low applied voltage, and the limitation to material selection is small. This method also allows a wider viewing-angle display in comparison with an device to which no gelling agent is added.

The self-organizing type gelling agent is an organic compound capable of forming a hydrogen bond between its own molecules, and examples thereof include organic compounds having at least an intermolecular hydrogen-bonding group, preferably, organic compounds having an intermolecular hydrogen-bonding group and an alkylene group. When the organic compound having an alkylene group together with an intermolecular hydrogen-bonding group is used as the gelling agent, the formation of the semi-network structure is accelerated by an intermolecular force exerted between the alkylene groups.

With respect to the intermolecular hydrogen-bonding group, not particularly limited as long as it is a group capable of forming a hydrogen bond between molecules containing the group, examples thereof include an amide bonding group (—NHCO—) and the like.

Preferably, one or more intermolecular hydrogen-bonding groups, more preferably, two or more intermolecular hydrogen-bonding groups, are contained in a molecule.

The alkylene group is a long chain alkylene group (hereinafter, also referred to as Re), particularly a divalent saturated hydrocarbon group having 4 or more carbon atoms, preferably 6 to 20 carbon atoms, which is more preferably given as a straight chain polymethylene group (—$(CH_2)_n$—).

Preferably, one or more alkylene groups, more preferably, two or more thereof, are contained in a molecule.

With respect to the gelling agent, the structure thereof is not particularly limited, as long as it is an organic compound having an intermolecular hydrogen-bonding group, preferably an intermolecular hydrogen-bonding group and an alkylene group.

Examples of the gelling agent include: alicyclic amide compounds represented by the following general formula (I), aliphatic amide compounds represented by the following formulas (II) to (IV) and aliphatic urea compounds represented by the following formula (V).

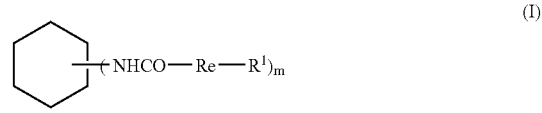

(I)

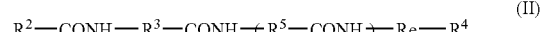

(II)

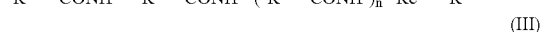

(III)

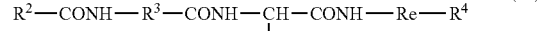

(IV)

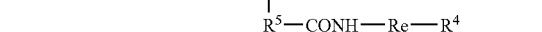

(V)

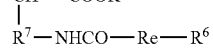

In the formula (I), $R^1$ represents an alkyl group, an aryloxy group or an aryl alkoxy group, and may contain a substituent such as a cyano group.

The alkyl group is prepared as an alkyl group having 1 to 3 carbon atoms, and examples thereof include a methyl group, an ethyl group, an n-propyl group and a sec-propyl group.

The aryloxy group is prepared as an aryloxy group having 6 to 14 carbon atoms, and examples thereof include a phenyloxy group, a biphenyloxy group and a naphthyloxy group.

The arylalkoxy group is a monovalent group in which one to two aryl groups having 6 to 14 carbon atoms are substituted by alkoxy groups having 1 to 3 carbon atoms, and examples thereof include a phenyl methoxy group, a phenyl ethoxy group, a phenyl propoxy group, a biphenyl methoxy group, a biphenyl ethoxy group and a biphenyl propoxy group.

Preferable $R^1$ is prepared as an alkyl group or an aryloxy group.

Re is the same group as the long chain alkylene group (Re), and the preferable groups thereof are the same as those of the afore-mentioned Re.

Moreover, m is an integer of 1 to 3, preferably 2.

In the case when there are a plurality of the same groups in one formula, each of the groups is individually selected from a predetermined range (hereinafter, the same is true).

Specific examples of the alicyclic amide compound (I) include the following compounds:

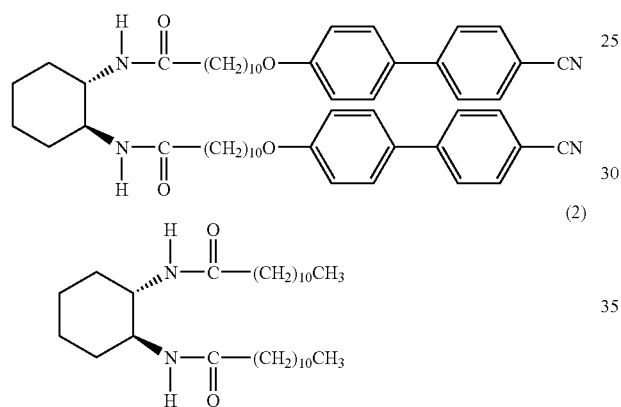

In the formulas (II) to (IV), the common group represents the same group.

$R^2$ represents the same group as the aforementioned $R^1$. Preferable examples of $R^2$ include an aryl alkoxy group.

$R^3$ represents a divalent alkylene group having 1 to 3 carbon atoms, and examples thereof include a methylene group, a dimethylene group and a trimethylene group. $R^3$ may have a substituent, and examples of the substituent include the following groups, and among these, a branched alkyl group having 3 to 5 carbon atoms is preferably used.

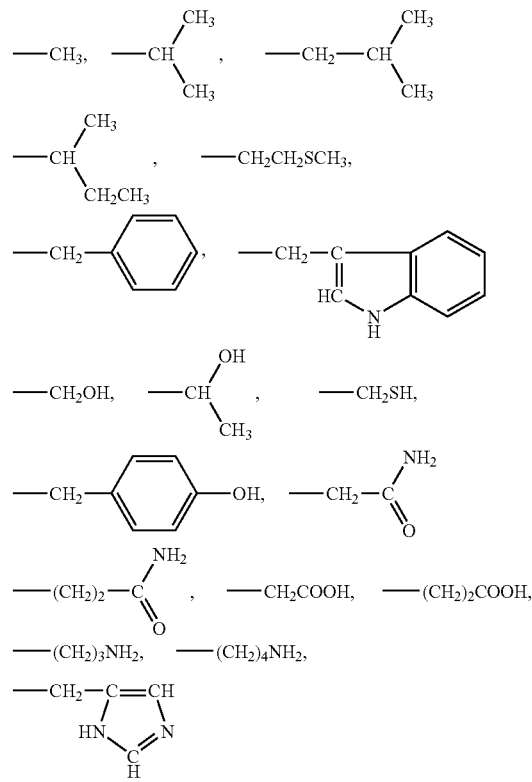

Re is the same group as the above-mentioned long chain alkylene group (Re), and preferable groups are also the same as those of the above-mentioned Re.

$R^4$ represents the same group as the aforementioned $R^1$. Preferable examples of $R^4$ include an alkyl group.

$R^5$ represents the same group as the aforementioned $R^3$. Preferable examples of $R^5$ include an alkylene group having no substituent.

Here, n is an integer of 0 to 3, preferably 0 to 1.

Preferable specific examples of such fatty amide compounds (II) to (IV) include the following compounds:

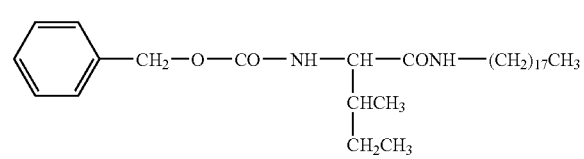

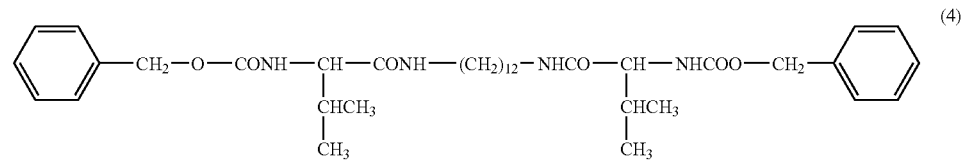

-continued

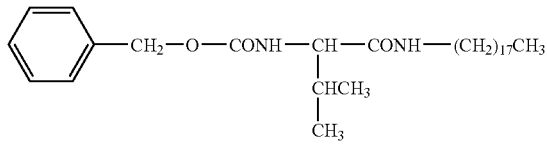
(5)

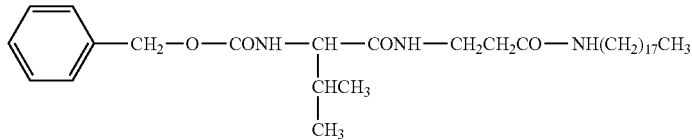
(6)

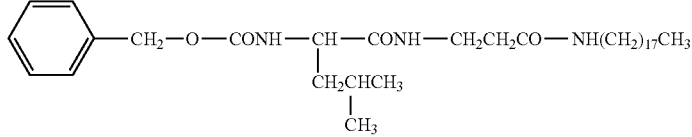
(7)

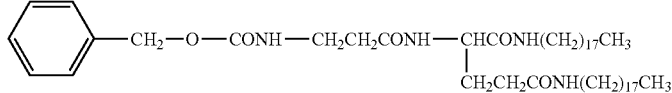
(8)

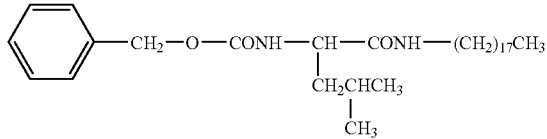
(9)

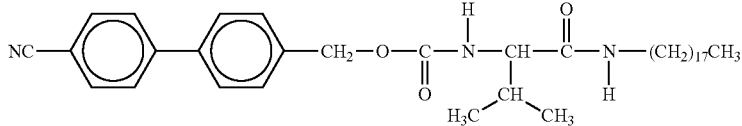
(10)

In the formula (V), $R^6$ represents the same group as the aforementioned $R^4$, and preferable groups are also the same as those of the above-mentioned $R^4$.

Re is the same group as the above-mentioned long chain alkylene group (Re), and preferable groups are also the same as those of the above-mentioned Re.

$R^7$ represents the same group as the aforementioned $R^5$, and preferable examples are also the same as those of the above-mentioned $R^5$.

Preferable specific examples of such aliphatic urea compounds (V) include the following compounds:

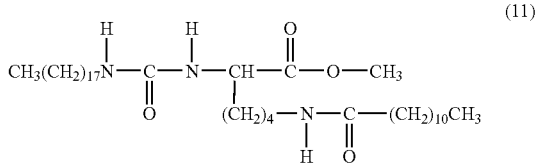
(11)

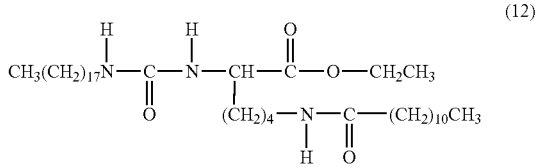
(12)

These compounds can be synthesized by using known synthesizing methods.

Among the above-mentioned compounds, preferable gelling agents include an alicyclic amide compound (I).

The content of the gelling agent is not particularly limited as long as the objective of the present invention is achieved, and is appropriately set in a range from 1.0 to 4.0% by weight with respect to the total amount of the cholesteric liquid crystal and the gelling agent. When the content is set in this range, the Y value is reduced at the time of a black display, making it possible to effectively improve the contrast.

The cholesteric liquid crystal containing the gelling agent exhibits a cholesteric phase at room temperature, and is prepared as, for example, a chiral nematic liquid crystal containing a nematic liquid crystal and a chiral agent.

With respect to the nematic liquid crystal, not particularly limited, those nematic liquid crystals conventionally known in the field of liquid crystal display devices may be used. With respect to the nematic liquid crystal material, examples thereof include: liquid crystalline ester compounds, liquid crystalline pyrimidine compounds, liquid crystalline cyanobiphenyl compounds, liquid crystalline tolan compounds, liquid crystalline phenyl cyclohexane compounds, liquid crystalline terphenyl compounds, other liquid crystalline compounds having a polar group, such as a fluorine atom, a fluoroalkyl group and a cyano group, and mixtures of these.

With respect to the chiral agent, various agents conventionally known in the field of liquid crystal display devices may be used. Examples thereof include cholesteric compounds having a cholesteric ring, biphenyl compounds having a biphenyl skeleton, terphenyl compounds having a terphenyl skeleton, ester compounds having a skeleton formed by two benzene rings connected by an ester bond, cyclohexane compounds having a skeleton formed by a cyclohexane ring directly bonded to a benzene ring, pyrimidine compounds having a skeleton formed by a pyrimidine ring directly bonded to a benzene ring, and azoxy or azo compounds having a skeleton formed by two benzene rings bonded by an azoxy bond or an azo bond.

Not particularly limited, the content of the chiral agent is normally set in a range from 3 to 40% by weight with respect to the total amount of the cholesteric liquid crystal and the gelling agent.

An additive such as an ultraviolet-ray absorbing agent may be added to the liquid crystal composition.

The ultraviolet-ray absorbing agent is added so as to prevent ultraviolet-ray deteriorations of the liquid crystal composition, such as discoloration with time and a change in response. Examples thereof include benzophenone compounds, benzotriazole compounds and salicylate compounds. The amount of addition is preferably set to not more than 5% by weight, more preferably, to not more than 3% by weight, with respect to the total amount of the cholesteric liquid crystal and the gelling agent.

The liquid crystal composition of this type is obtained by mixing the respective materials at predetermined ratios.

The liquid crystal composition is made in contact with an ion exchange resin-adsorbing agent and the like to be refined so that impurities are removed; thus, the resulting composition is used for manufacturing the device.

(Sealant)

A sealant 12 is inserted so as to prevent the liquid crystal composition 11 between the substrates 1 and 2 from leaking outside, and is constituted by a thermosetting resin, such as epoxy rein and acrylic resin, or a photo-curable adhesive.

(Polymer Structure)

A polymer structure 10 may be formed into any shape such as a column shape, an elliptical column shape and a quadrangular pillar shape, and is placed at random, or in a regular pattern such as a lattice pattern. By placing such polymer structures, the substrate-to-substrate gap is easily kept constant so that the self-retaining property of the liquid crystal display device is also improved. In particular, when dot shaped polymer structures are placed with constant intervals, it is possible to easily provide a uniform display performance. The height of the polymer structures corresponds to the thickness of a cell gap, that is, the thickness of a liquid crystal layer containing the liquid crystal composition. In the case when flexible resin substrates are used as the substrates for sandwiching the liquid crystal layer, it is particularly effective to place polymer structures, because it can be prevented that the thickness of the liquid crystal layer becomes nonuniform being caused by the flexibility of the substrate. It is particularly effective to make the thickness of the crystal liquid layer uniform that the spacer of spherical body and the polymer structure are used in combination and that the polymer structure is provided with adhesive function to bond the upper and lower substrates.

Upon forming polymer structures, a photo-curable resin material, such as a photoresist material constituted by an ultraviolet-ray-setting monomer, is applied to the outermost surface film (insulating thin film, orientation film) of a substrate with a predetermined thickness, and this is irradiated with ultraviolet rays through a mask so as to carry out a pattern exposing process to remove uncured portions; that is, a so-called photolithography method can be used.

Alternatively, a resin material, prepared by dissolving a thermoplastic resin in an appropriate solvent, may be used to form polymer structures constituted by the thermoplastic resin. In this case, a printing method in which the substrate is printed by extruding a thermoplastic resin by using a screen plate and a metal mask, a method in which a resin material is discharged onto the substrate through the tip of a nozzle, such as a dispenser method and an ink-jet method, or a transferring method in which, after a resin material has been supplied onto a flat plate or a roller, the resulting material is transferred onto the surface of the substrate, may be used so as to place the polymer structures.

(Scattering Layer)

A scattering layer (not shown) may be paced on the surface (upper face in the Figure) of the substrate 1 and/or between the substrate 2 and the visible-light-absorbing layer 9. By placing the scattering layer, the degree of scattering at the time of a white display is increased so that the whiteness degree is improved. With respect to the scattering layer, for example, an FT-014 (trade name, made by Polatechno Co., Ltd.) may be used.

As the thickness of the cell gap in a liquid crystal display device, that is, the thickness of the liquid crystal layer constituted by the liquid crystal composition, becomes greater, the reflectance at the time of a white display increases; however, the driving voltage and the reflectance at the time of a black display also increase. Therefore, the thickness of the cell gap may be set in a range from 2 to 50 µm, more preferably, in a range from 3 to 15 µm. By setting the cell gap in such a preferable range, the effect, which achieves a high contrast upon application of a comparatively low voltage, can be effectively obtained.

(Manufacturing Method)

The first manufacturing method for a liquid crystal display device relating to a preferable embodiment of the present invention is characterized in that a cholesteric liquid crystal, which contains a gelling agent and is in a heated state, is spread over at least one of substrates to form a liquid crystal layer thereon.

Upon injecting the liquid crystal composition, the following method is adopted.

(1) A heated liquid crystal composition is vacuum-injected into empty cells of a liquid crystal display device, and the injection pores are then sealed. Here, the liquid crystal composition has a thermo-reversible property.

The empty cells of the liquid crystal display device may be manufactured through processes in which two substrates having predetermined constituent parts of the liquid crystal display device formed therein are superposed on each other so as to make the part-formation faces face to face with each other, and then heated and/or pressure-applied.

(2) A heated liquid crystal composition may be applied onto one of the substrates, that is, the two substrates having predetermined constituent parts of the liquid crystal display device formed thereon, by using a coating device such as a spin coater, a bar coater and a roll coater, or may be simply dropped thereon. Thereafter, the other substrate is superposed thereon, and a sealing process is carried out through a pressure-applying process and/or a heat-applying process.

In each of the cases, since the flowability of the liquid crystal composition increases due to the applied heat, the injecting process into the substrate gap and the formation of the liquid crystal layer on the substrate are easily carried out in a short time.

The second manufacturing method for a liquid crystal display device relating to a preferable embodiment of the present invention is characterized in that a cholesteric liquid crystal in a non-heated state, which contains a gelling agent and exerts flowability at room temperature, is spread over a substrate to form a liquid crystal layer thereon. When the amount of addition of the gelling agent is small with the liquid crystal composition exerting flowability at room temperature, the second manufacturing method is preferably used. In the second manufacturing method, since, upon carrying out a vacuum injection as described in the above-mentioned (1), or upon carrying out a coating process on one of substrates as described in the above-mentioned (2), or upon superposing the other substrate thereof after the dropping process, these processes are conducted at room temperature without the necessity of a heating process so that the manufacturing processes can be simplified.

(Display Method)

In the liquid crystal display device having the above-mentioned arrangement, a displaying operation is carried out by applying a pulse voltage to the electrodes 3 and 4 from a driving circuit 20. For example, a PL-FC driving system, which carries out a displaying operation by switching the states of the liquid crystal layer between the planar state and focal conic state, may be adopted, or a PL-Homeo driving system, which carries out a displaying operation by switching states of the liquid crystal layer between the planar state and homeotropic state, may be adopted.

For example, in the PL-FC driving system, by applying a pulse voltage with a comparatively high energy (high voltage value, large pulse width) thereto, the liquid crystal is made into the planar state so that light having a wavelength determined based upon the helical pitch and the refractive index of liquid crystal molecules is selectively reflected. In contrast, by applying a pulse voltage with a comparatively low energy (low voltage value, small pulse width) thereto, the liquid crystal is made into the focal conic state so that it becomes transparent. Various driving waveforms have been proposed: for example, a driving waveform which, after the liquid crystal has been reset to the focal conic state by applying a comparatively low voltage for a long time, changes only a desired portion into the planar state, a driving waveform which, after the liquid crystal has been reset to the planar state by suddenly turning off a voltage in a high-voltage applied state, changes only a desired portion into the focal conic state, and a driving waveform consisting of three stages which, after the liquid crystal has been made into the homeotropic state by applying a reset pulse thereto, applies a selective pulse having a size corresponding to a display state to be finally obtained, and further applies a pulse for ensuring the finally selected state, may be adopted. These driving systems make it possible to maintain a display even after stopping the voltage application by utilizing the memory property of the liquid crystal display device. Here, the application of a visible-light absorbing layer 9 provides a black display in the focal conic state.

For example, in the PL-Homeo driving system, the planar state is achieved by abruptly turning off a voltage in a high-voltage applied state, while the homeotropic state of the liquid crystal is maintained by continuously applying a high voltage. In the homeotropic state, the transparency becomes higher than that in the focal conic state so that this is advantageous in improving the contrast (the application of the visible-light-absorbing layer 9 also provides a black display in the homeotropic state); however, it is necessary to continuously apply the voltage in order to maintain the display.

Figure 2:
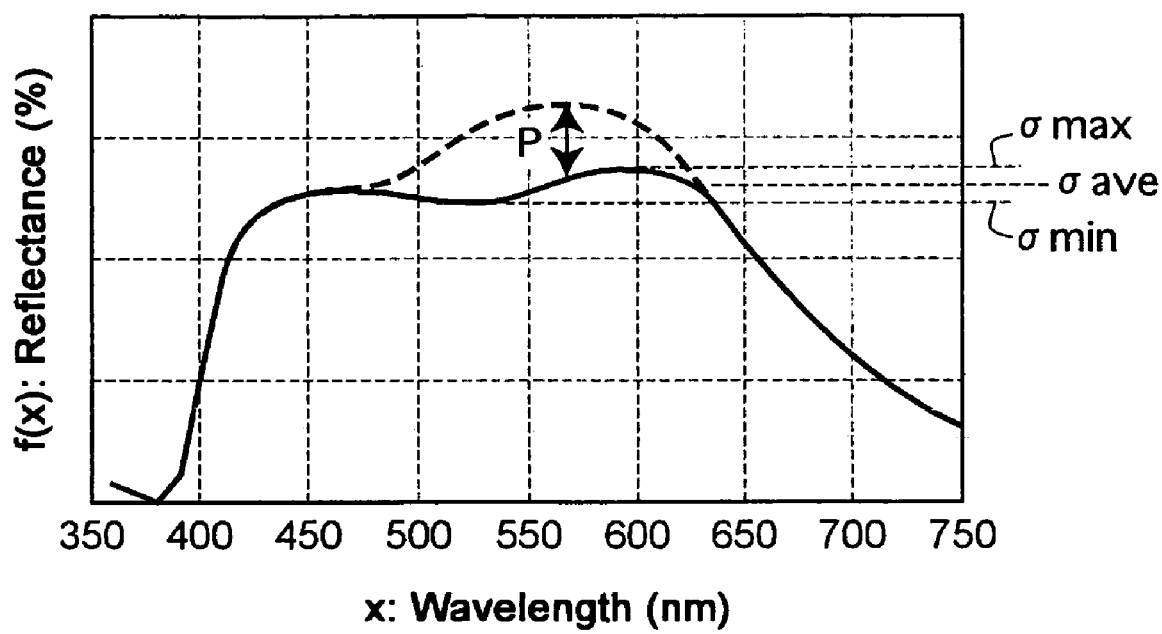
FIG. 2 shows one example of a spectral distribution curve that is possessed by the liquid crystal display device.

In FIG. 2, the solid line indicates one example of a spectral distribution curve that is possessed by the liquid crystal display device of the present embodiment. In the spectral distribution curve indicated by the solid line, the variation in reflectance is small in a range from 450 to 600 nm. More specifically, the maximum value σmax and the minimum value σmin are within 1% of the average value σave in the range from 450 to 600 nm. As a whole, the whiteness degree parameter (d) is in a range of not more than 0.01. When such a spectral distribution curve is shown, light rays having wavelengths in a wide range can be reflected comparatively uniformly so that the whiteness degree is made smaller; therefore, this state is regarded as a white display.

In FIG. 2, the dot line indicates another example of a spectral distribution curve that is possessed by the liquid crystal display device of the present embodiment. The spectral distribution curve, indicated by the dot line, is the same as that indicated by the solid line, except that a greater peak (portion P in the Figure) appears in a range from 500 to 650 nm, in particular from 550 to 600 nm. The presence of the peak portion represented by a difference from the spectral distribution curve indicated by the solid line allows the whiteness degree parameter (d) to be set in a range from more than 0.01 to 0.04 or less. When the spectral distribution curve of this type is obtained, the Y value (PL) becomes greater than that indicated by the solid line, making it possible to provide a high contrast.

In other words, at the time of PL display, when "whiteness" is desirably exerted, the solid line is selected, and at the time of PL display "brightness" (high contrast) is desirably exerted, the dot line is selected.

In still another embodiment of the present invention, in the case of the planar state containing no gelling agent, the spectral distribution curve satisfies the following conditions:

(I) Two or more peaks, preferably two peaks, are included within a wavelength range from 400 to 700 nm; more preferably, one peak is located within a wavelength range from not less than 400 nm to less than 500 nm, in particular, from not less than 400 nm to not more than 470 nm (hereinafter, the maximum peak within the range is referred to as peak A); and the other peak is located within a wavelength range from not less than 500 nm to not more than 700 nm, in particular, from not less than 520 nm to not more than 650 nm (hereinafter, the maximum peak within the range is referred to as peak B).

Figure 13:
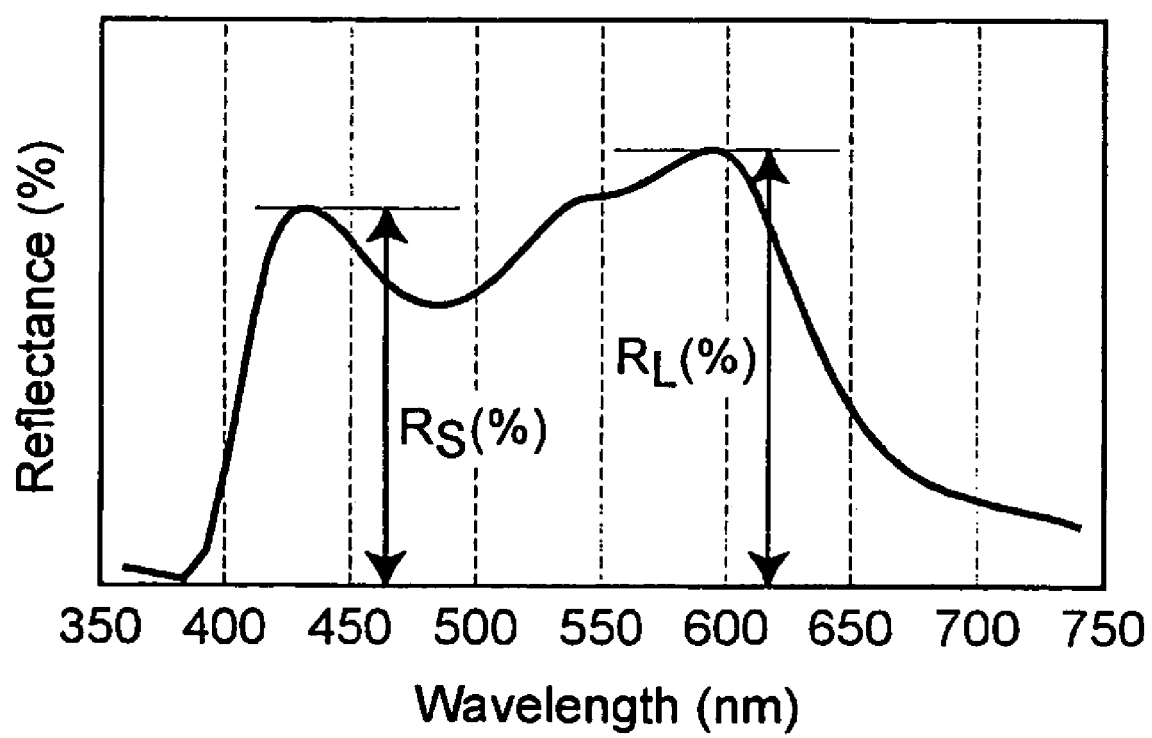
FIG. 13 shows one example of a spectral distribution curve that is possessed by the liquid crystal device of the present invention, when the device contains no gelling agent.

(II) Supposing that the maximum reflectance in a wavelength range from not less than 400 nm to not more than 500 nm, in particular, from not less than 400 nm to not more than 470, is $R_S$ (see FIG. 13) and that the maximum reflectance in a wavelength range from not less than 500 nm to not more than 700 nm, in particular, from than 520 nm to not more than 650 nm, is $R_L$ (see FIG. 13), the relationship of $R_L \times 0.4 \leq R_S$, preferably $R_L \times 0.5 \leq R_S$, more preferably $R_L \times 0.6 \leq R_S$, is satisfied.

The state in which no gelling agent is contained refers to a state in which the same structure as the liquid crystal display device of the present invention except that no gelling agent is contained is used.

The liquid crystal display device of the present embodiment is allowed to satisfy the above-mentioned conditions in the state in which no gelling agent is contained; thus, both of "whiteness" and "brightness (high contrast)" at the time of PL display in the liquid crystal display device in the case when a gelling agent is contained therein are effectively achieved, and the device manufacturing process is also easily simplified. When the device in the state in which no gelling agent is contained is allowed to satisfy the above-mentioned conditions, the reduction effect in the whiteness degree parameter (PL) exerted by the addition of a gelling agent is effectively obtained. In other words, the whiteness degree can be improved by adding only a comparatively small amount of a gelling agent thereto. Consequently, the whiteness degree can be improved while the increase in the Y value (FC) due to the addition of the gelling agent is suppressed to the minimum. Thus, both of the above-mentioned properties can be achieved comparatively easily. In the case when the amount of the addition of the gelling agent is too great, since the flowability of the liquid crystal composition at room temperature is lowered, it is necessary to heat the liquid crystal composition in the manufacturing processes of the device. In the present embodiment, since the amount of addition of the gelling agent is lowered while the liquid crystal composition is allowed to have a desired flowability at room temperature, the liquid crystal composition can be used in a non-heated state. Consequently, the effect of simplifying the manufacturing processes is also obtained.

The above-mentioned conditions (I) and (II) can be controlled and achieved by the following method.

For example, when liquid crystal molecules are made into a standing state by using a perpendicular orientation film or the like, or when a liquid crystal having a high anisotropy of refractive index is used, two or more peaks, in particular, two peaks, appear and the wavelength of peak A becomes smaller while the wavelength of peak B becomes greater.

EXAMPLES (Measurements on Y Value (PL) and Y Value (FC))

Figure 3:
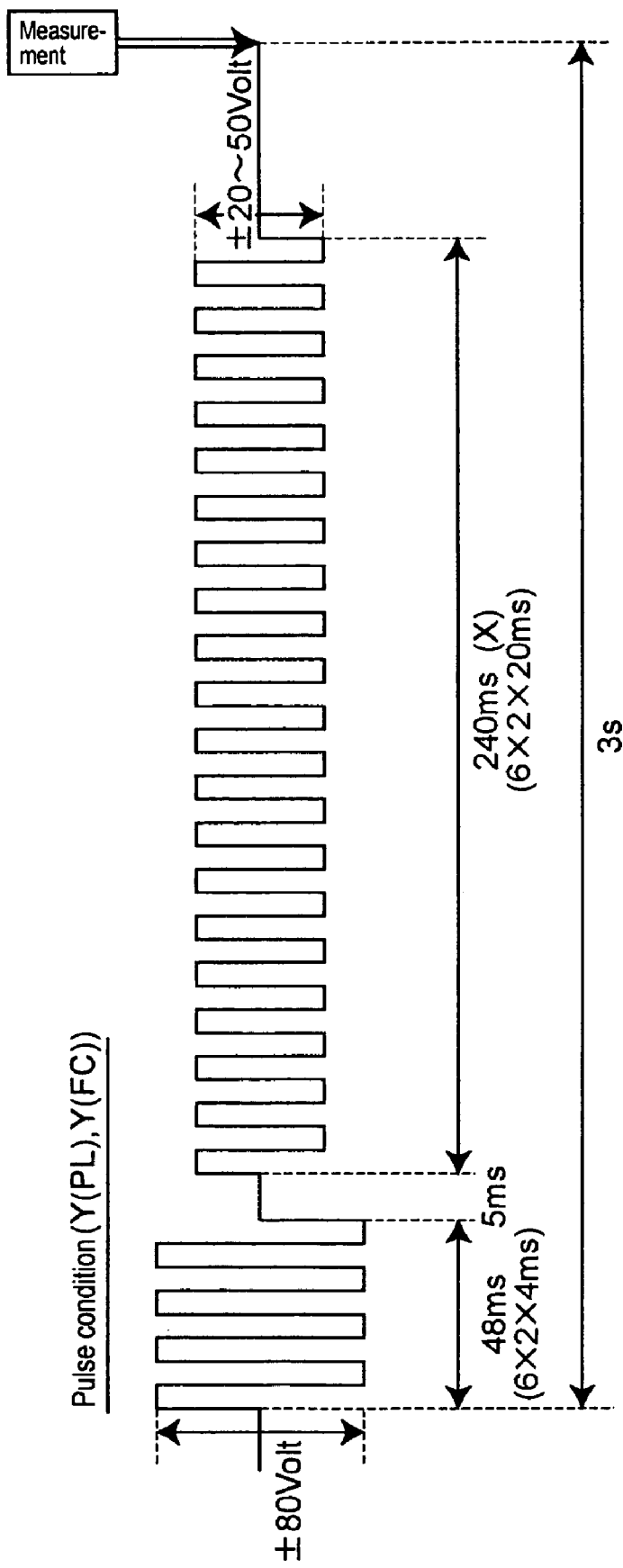
FIG. 3 is a drawing that shows one example of a driving waveform to be used in an experiment.
Figure 4:
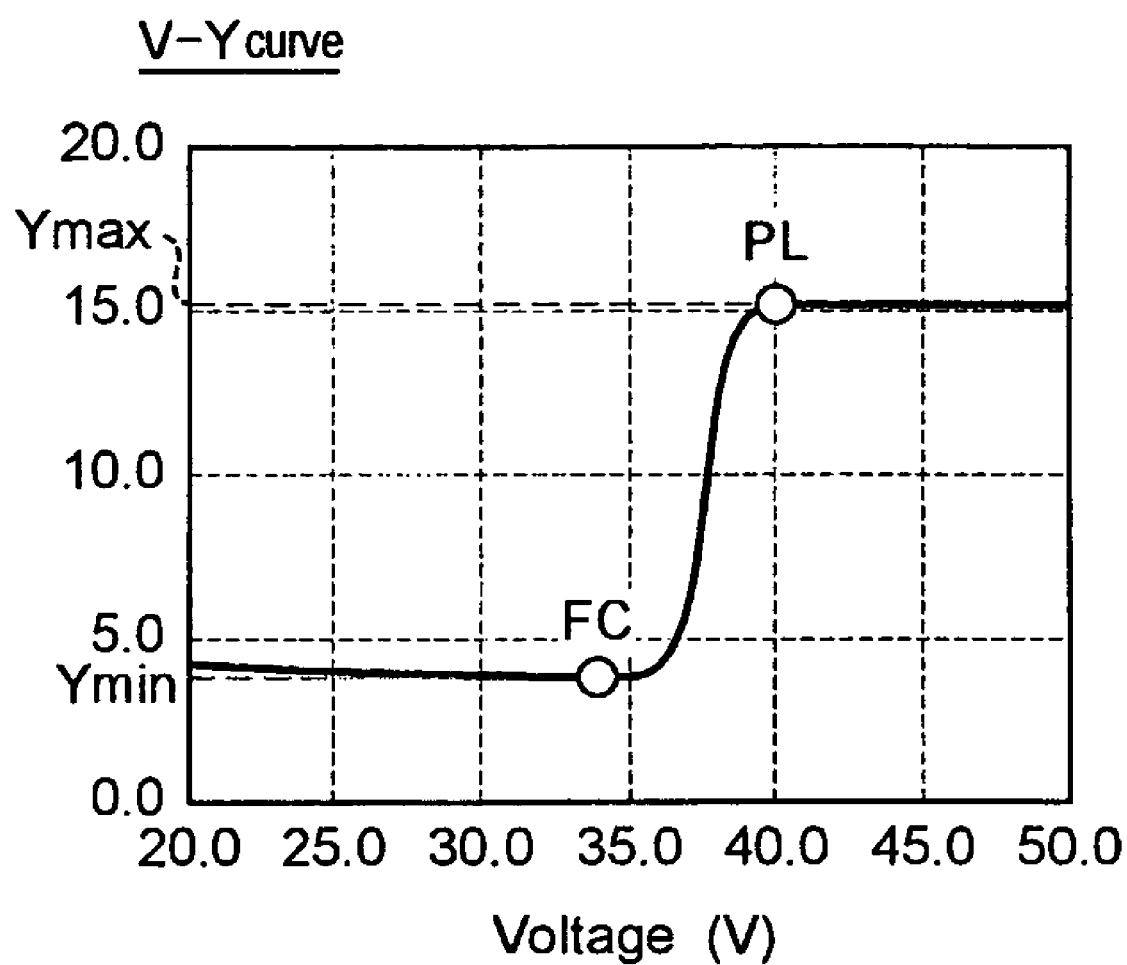
FIG. 4 shows one example of a V-Y curve that is used for setting a planar state and a focal conic state.

A pulse shown in FIG. 3 (in this driving waveform, the liquid crystal is preliminarily reset to a planar state by a pulse in the preceding stage) is applied to obtain a voltage-Y value curve (hereinafter, referred to as V-Y curve). More specifically, while the voltage (V) in a range (X) of the pulse of FIG. 3 is being varied from ±20 to ±50 V, spectral distribution curves (wavelength-reflectance curve) and Y values (Y) of the device at measuring points shown in the Figure are measured repeatedly a plurality of times by using a spectrophotometric device (CM3700d; made by Konica Minolta Sensing, Inc.); thus, V (absolute value of voltage)-Y (Y value) curve is formed. One example of V-Y curve is shown in FIG. 4. In this V-Y curve, the state indicated by the greatest Y value (Ymax) is defined as a planar state (PL), and the state indicated by the smallest Y value (Ymin) is defined as a focal conic state (FC). Y values at these states are respectively defined as the Y value (PL) and the Y value (FC). In this case, the contrast is indicated by Y value (PL)/Y value (FC).

(Measurements on Y Value (Homeo))

Figure 5:
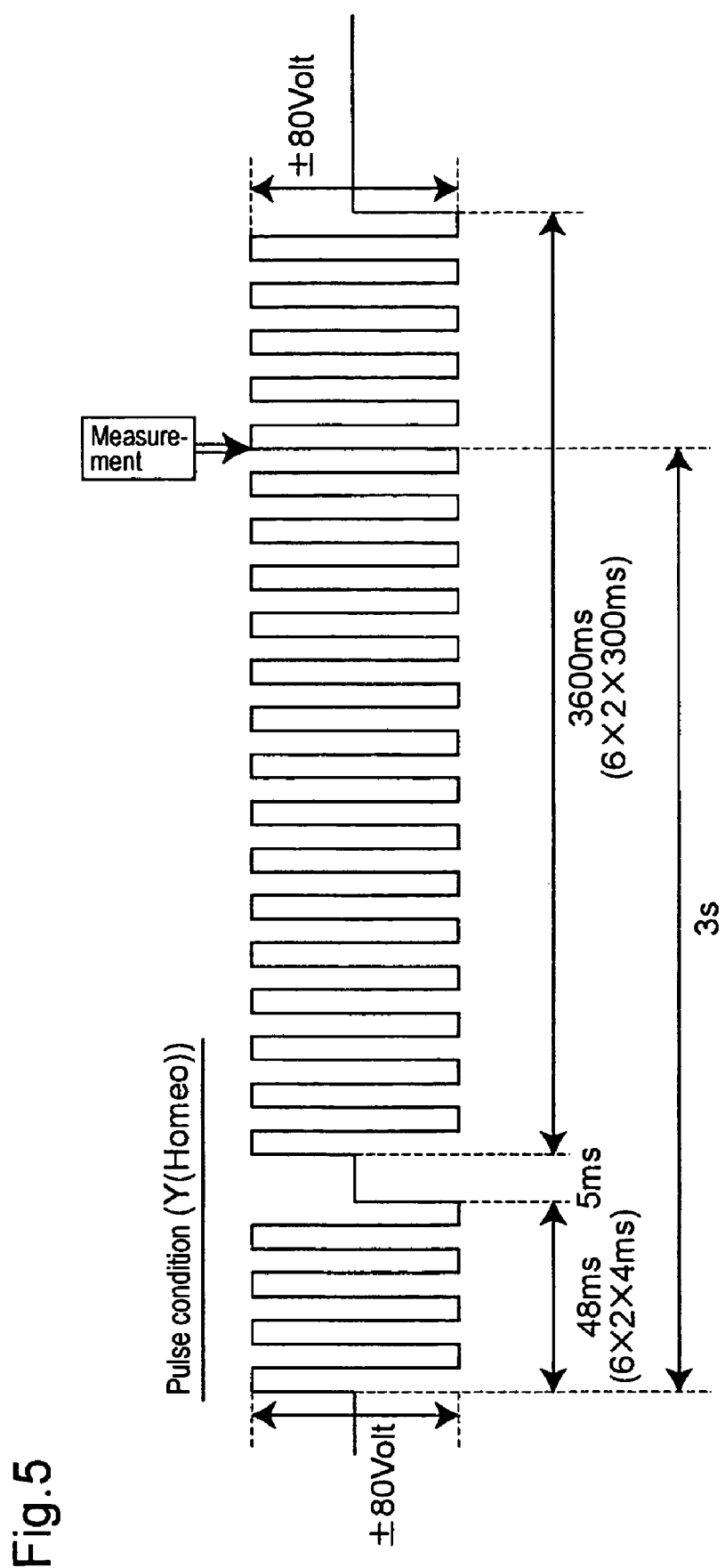
FIG. 5 is a drawing that shows another example of the driving waveform to be used in the experiment.

A pulse shown in FIG. 5 is applied to a display device so that spectral distribution curves (wavelength-reflectance curve) and Y values of the device at measuring points shown in the Figure are measured by using a spectrophotometric device (CM3700d; made by Konica Minolta Sensing, Inc.); thus, the resulting value is defined as the Y value (Homeo). In this case, the contrast is indicated by Y value (PL)/Y value (Homeo).

In the following description, "parts" refers to "parts by weight".

Experiment Example 1

Example 1

Nematic liquid crystal (BL006; made by Merck Ltd., anisotropy of refractive index: 0.286, anisotropy of dielectric constant: 17.3, viscosity: 71 mP·s, NI point: 113° C.) (60 parts), a chiral agent (CB15; made by Merck Ltd.) (38 parts) and a gelling agent (2 parts) represented by the aforementioned chemical formula (2) were mixed to prepare a chiral nematic liquid crystal composition.

By using the resulting liquid crystal composition and materials described below, a display device as shown in FIG. 1 (in which polymer structures and an insulating thin film were not shown) was manufactured. The cell gap was 5.5 μm. The respective values were measured at 25° C.

Substrate: Glass 0.7 mm

ITO sheet resistance value: 10Ω/□

Orientation film: Soluble polyimide (Perpendicular orientation film AL-2022; made by JSR Corporation)

Thickness of orientation film: 60 nm (printed)

Spacer: Micropearl 5.5 μm; made by Sekisui Fine Chemical Co., Ltd.

Sealant: Sumilite ERS-2400 (main agent), ERS-2840 (curing agent); made by Sumitomo Bakelite Co., Ltd.

Figure 6A:
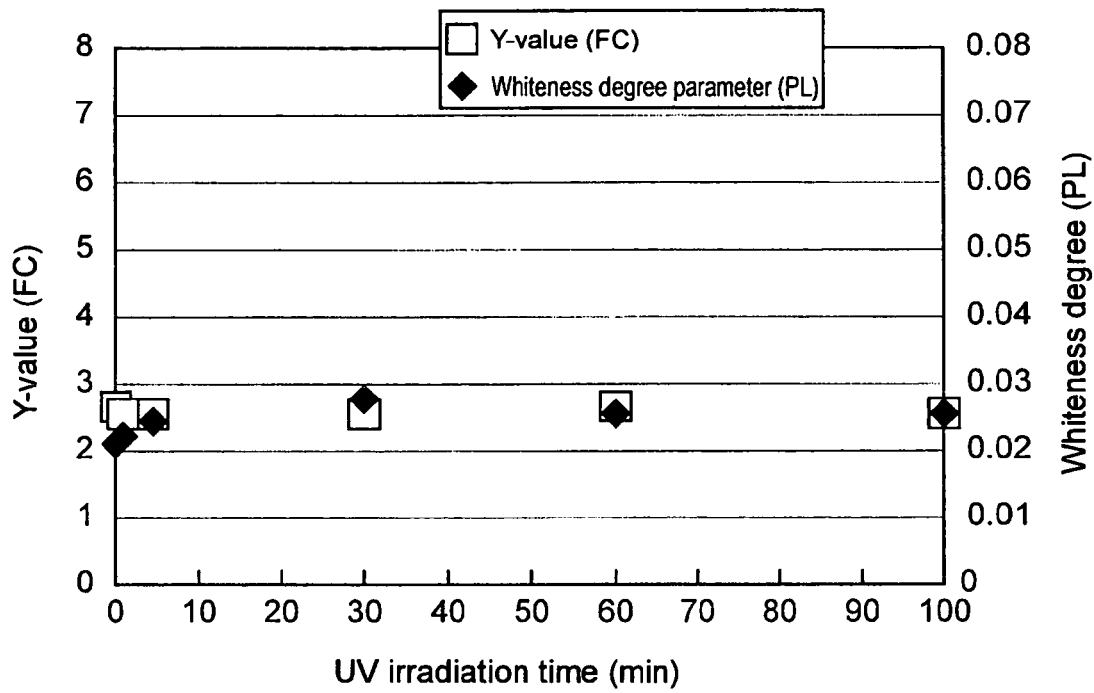
FIG. 6A is a graph that indicates a relationship between the irradiation time and Y value (FC) as well as the whiteness degree parameter (PL) of the liquid crystal display device in an example of the present invention.
Figure 6B:
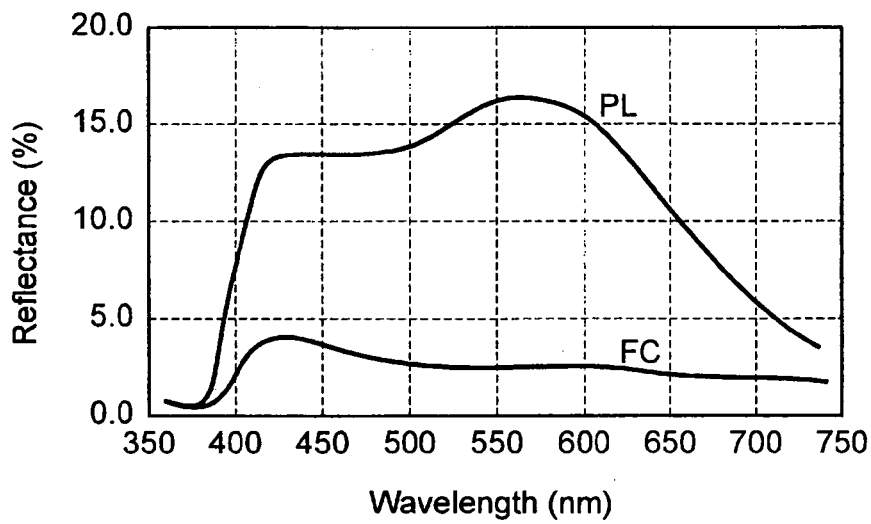
FIG. 6B shows spectral distribution curves of the PL state and FC state at respective irradiation times.

The resulting display device was subjected to UV irradiation, and variations in the Y value (FC) and the whiteness degree parameter (PL) in response to the irradiation time were traced (UV luminance: 5 mW/cm$^2$). With respect to the respective irradiation times, spectral distribution curves in the respective PL state and FC state in the display device were measured. The results of the measurements are respectively shown in FIGS. 6(A) and 6(B). Here, in FIG. 6(B), the spectral distribution curves of the PL state and FC state in the respective irradiation times are respectively superposed on one curve.

Example 2

The same method as example 1 was used except that the amount of addition of the gelling agent was changed to 3 parts to prepare a display device.

Figure 7A:
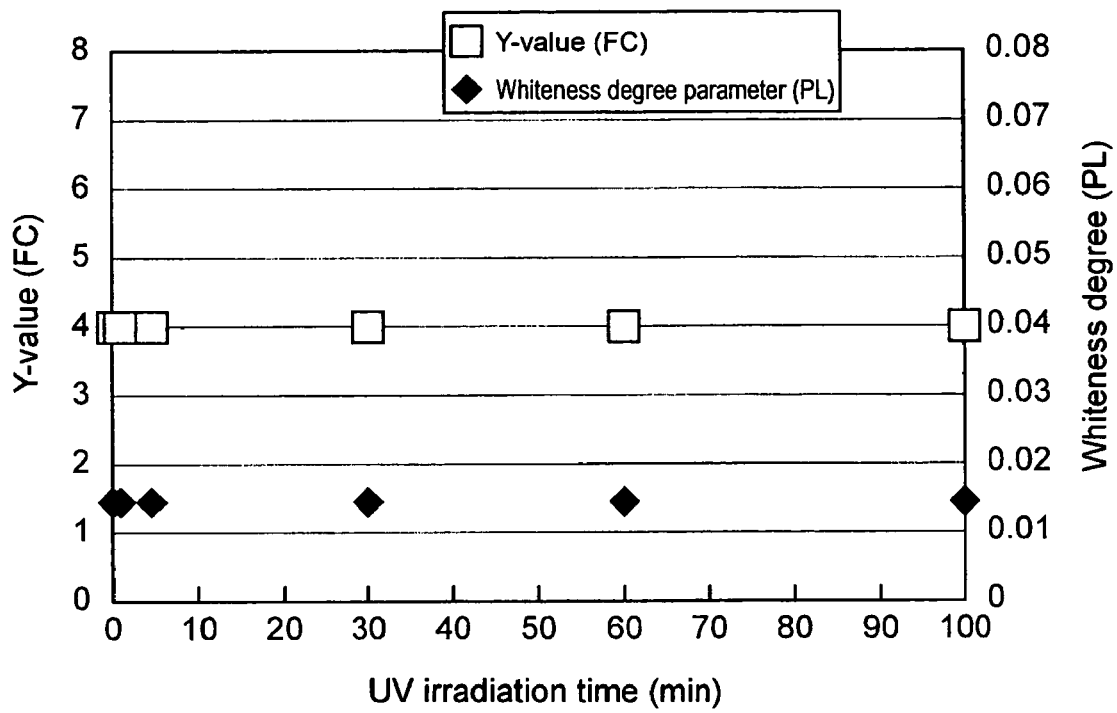
FIG. 7A is a graph that indicates a relationship between the irradiation time and Y value (FC) as well as the whiteness degree parameter (PL) of the liquid crystal display device in the example of the present invention.
Figure 7B:
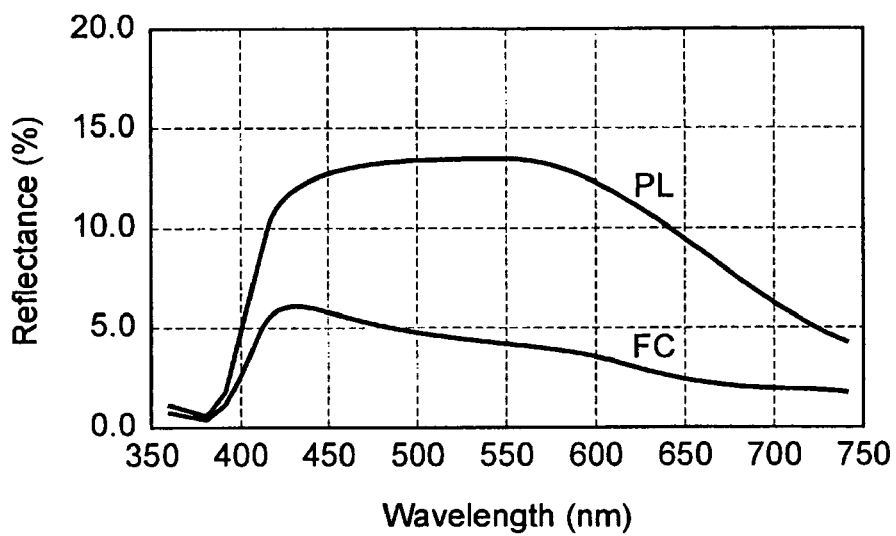
FIG. 7B shows spectral distribution curves of the PL state and FC state at respective irradiation times.

The resulting display device was subjected to UV irradiation, and variations in the Y value (FC) and the whiteness degree parameter (PL) in response to the irradiation time were traced (UV luminance: 5 mW/cm$^2$). With respect to the respective irradiation times, spectral distribution curves in the respective PL state and FC state in the display device were measured. The results of the measurements are respectively shown in FIGS. 7(A) and 7(B). Here, in FIG. 7(B), the spectral distribution curves of the PL state and FC state in the respective irradiation times are respectively superposed on one curve.

Comparative Example 1

Nematic liquid crystal (BL006; made by Merck Ltd., chiral agent (CB15; made by Merck Ltd.), a monomer (KAYARAD R-684; made by Nippon Kayaku Co., Ltd.) and a polymerization initiator (DAROCURE 1173; made by Nagase & Co., Ltd.) were mixed to prepare a chiral nematic liquid crystal composition. The mixing ratios of these materials are shown below: Monomer:polymerization initiator=97:3 (weight ratio). Monomer+polymerization initiator (hereinafter, collectively referred to as polymerization reactive agent):nematic liquid crystal+chiral agent (hereinafter, collectively referred to as chiral nematic mixture)=5:95 (weight ratio). The mixed ratio of the nematic liquid crystal and the chiral agent is set to such a ratio that the peak wavelength of selective reflection prior to UV irradiation of the resulting chiral nematic liquid crystal composition becomes 580 nm.

The same method as example 1 was used except that this chiral nematic liquid crystal composition was applied to manufacture a display device.

Figure 8A:
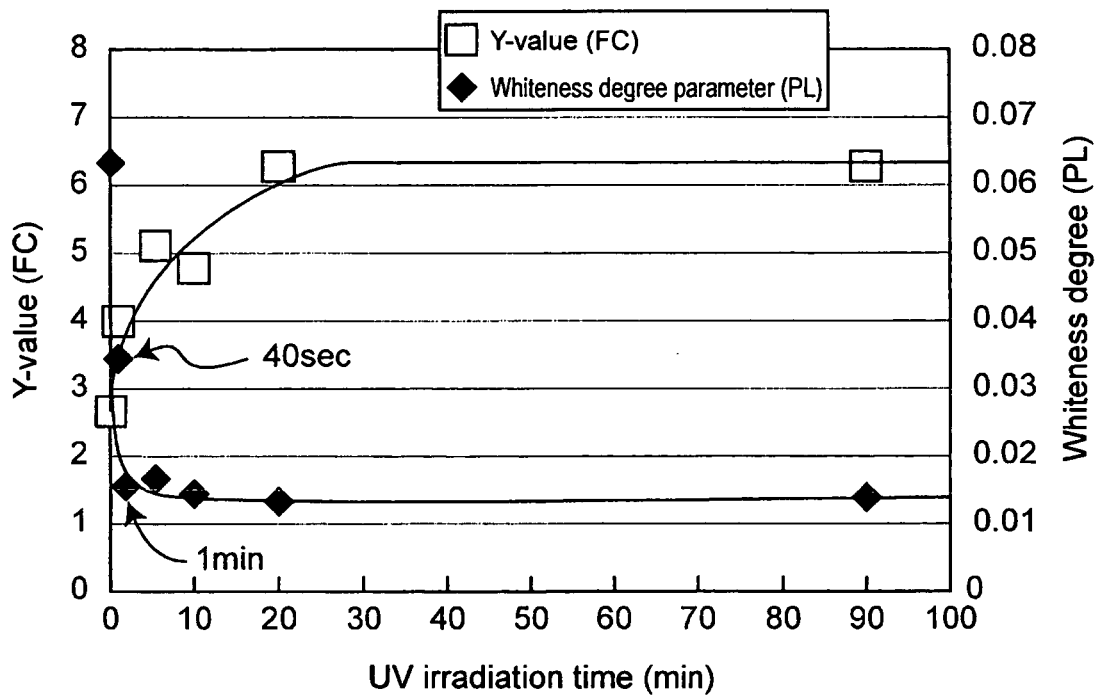
FIG. 8A is a graph that indicates a relationship between the irradiation time and Y value (FC) as well as the whiteness degree parameter (PL) of the liquid crystal display device in the example of the present invention.
Figure 8B:
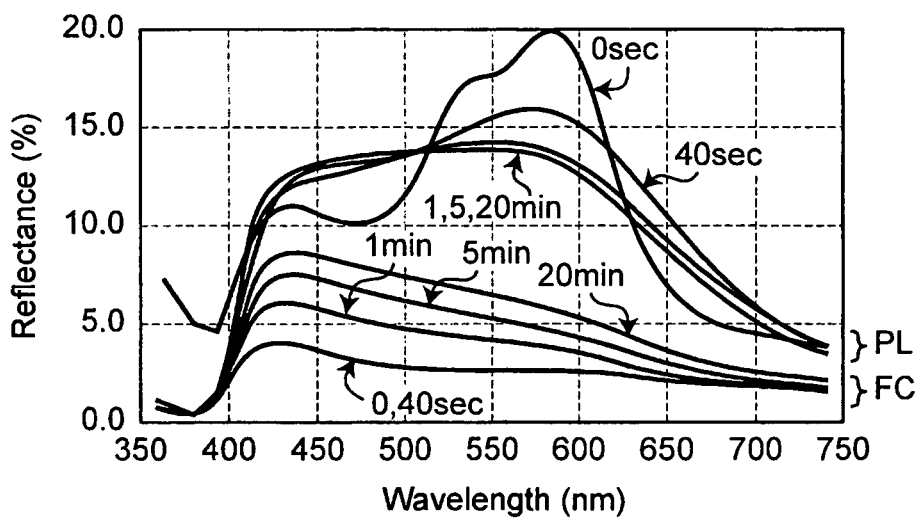
FIG. 8B shows spectral distribution curves of the PL state and FC state at respective irradiation times.

The resulting display device was subjected to UV irradiation, and variations in the Y value (FC) and the whiteness degree parameter (PL) in response to the irradiation time were traced (UV luminance: 5 mW/cm²). With respect to the respective irradiation times, spectral distribution curves in the respective PL state and FC state in the display device were measured. The results of the measurements are respectively shown in FIGS. 8(A) and 8(B).

(Consideration)

The display devices of examples 1 and 2 had no changes in the Y value (FC) as well as in the whiteness degree parameter even when the irradiation time was prolonged so that the accumulated quantity of light increased.

The display device of comparative example 1 had an increase in the Y value (FC) when the irradiation time was prolonged so that the accumulated quantity of light increased. The whiteness degree was greatly varied from that shown in FIG. 8. This shows that the Y value (PL)(brightness) is lowered and that the color tone is also changed from the initial state. This also indicates that, when this display device is applied as devices that are frequently used outdoors, such as, electronic books and PDAs, the panel deteriorates in several months to several years, even when used with UV-cut films adhered thereto. In the device of comparative example 1, as the irradiation time became longer, the Y value (FC) increased, and when it had virtually reached a saturated value, the resulting value became considerably greater in comparison with those of the examples. Consequently, the device of comparative example 1 had a reduction in contrast as time elapsed, and when the value had reached a saturated value, only a lower contrast as compared with those of examples was exerted.

As described above, it can be understood that the display devices of the examples of the present invention makes it possible to provide a display with a high contrast, which is free from a reduction (change in color tone) in brightness due to light deterioration.

With respect to the whiteness degree parameter (d), the following facts have been obtained:

In a range of d≦0.04, the displayed white color is virtually regarded as white; in a range of 0.04<d<0.05, the displayed while color is not regarded as white occasionally depending on light sources; and in a range of d≧0.05, the displayed color is certainly regarded as yellow or green.

Moreover, d is virtually in proportion to the brightness (lightness Y=Y value (PL), in the present specification).

Therefore, the parameter is preferably set in a range of d≦0.04.

In comparative example 1, the ratio, polymerization reactive agent:chiral nematic liquid crystal composition=5:95 (weight ratio), is determined based upon the following facts.

In a system in which chiral nematic liquid crystal is used as the polymer dispersion type liquid crystal so that a "scattering+selective reflection" process is used to provide a display, the displaying characteristics are varied greatly depending on the mixed ratio of the monomer and the chiral nematic liquid crystal.

In the case when the ratio of the polymerization reactive agent to the total amount of that and the chiral nematic liquid crystal composition was not less than 3% by weight, the amount of the polymerization reactive agent became insufficient, with the result that, even when the irradiation time was prolonged to increase the accumulated quantity of light, it was not possible to obtain sufficient scattering. In contrast, when the ratio thereof was not less than 10% by weight, the amount of the polymerization reactive agent became too much, with the result that the Y value in a black display became higher (not less than 7 in Y value) even upon receipt of a small accumulated quantity of light to cause an insufficient contrast.

Consequently, in this manner, the mixed ratio has an appropriate range, and in an attempt to obtain a sufficient contrast in the initial state with the whiteness degree parameter (PL)(d) being lowered to a sufficient level, it is found that the ratio is about 5% by weight.

Experiment Example 2

Wavelength Dependence

The same method as example 1 was used, except that the mixed ratio of BL006 (made by Merck Ltd.) and CB15 (made by Merck Ltd.) in the chiral nematic liquid crystal composition was changed so that the peak wavelength of selective reflection in the spectral distribution curve of the resulting display device was set to a predetermined value and that the cell gap was changed to 7.0 µm, to manufacture a plurality of display devices having different peak wavelengths of selective reflection.

Figure 9A:
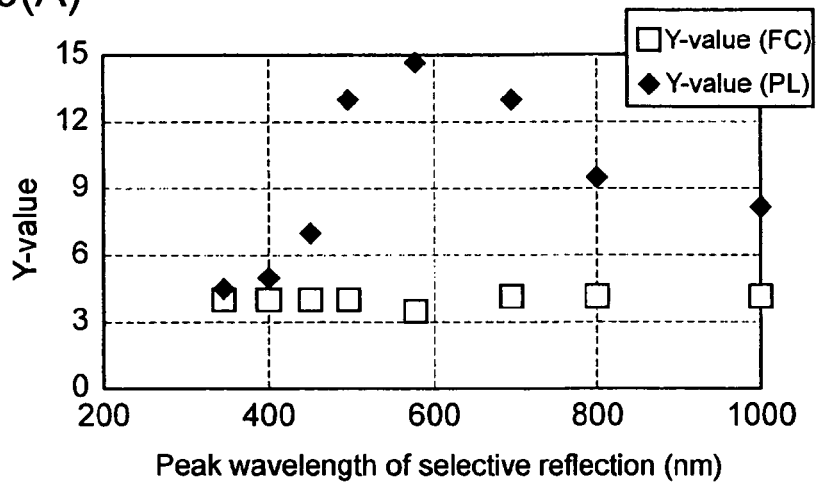
FIGS. 9A to 9C are graphs formed based upon example 2.
Figure 9B:
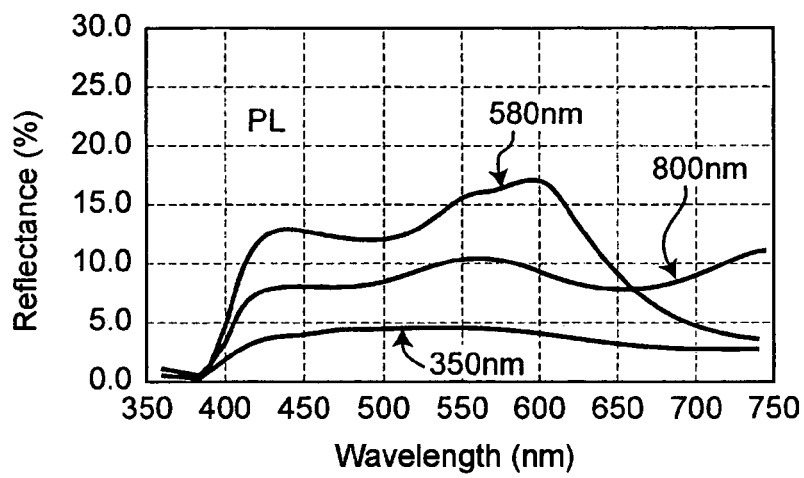
Figure 9C:
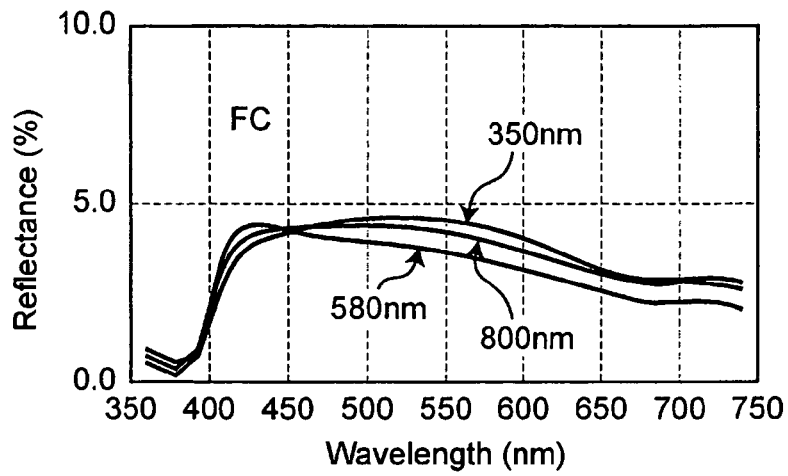

The Y value (PL) and Y value (FC) of the resulting display device were measured to examine the relationship between the peak wavelength of selective reflection and the Y value. With respect to display devices having respective peak wavelengths of selective reflection of 350 nm, 580 nm and 800 nm, spectral distribution curves were measured. FIGS. 9(A) to 9(C) show the results of the measurements.

FIG. 9(A) shows that when the peak wavelength of selective reflection is in a range from 500 to 700 nm, a superior contrast is obtained. This is presumably because, when the peak wavelength of selective reflection is set in this range, a sub-peak on the low wavelength side can be effectively utilized as shown in FIG. 9(B).

Experiment Example 3

Added Amount Dependence

The same method as example 1 was used, except that the mixed ratio of BL006 (made by Merck Ltd.) and CB15 (made by Merck Ltd.) in the chiral nematic liquid crystal composition was changed so that the peak wavelength of selective reflection in the spectral distribution curve of the resulting display device was set to 580 nm, that the amount of addition of the gelling agent was changed in a predetermined range, and that the cell gap was changed to 7.0 µm, to manufacture a display device. The amount of addition of the gelling agent refers to a ratio (weight %) of the gelling agent to the total amount of the nematic liquid crystal, chiral agent and gelling agent.

The Y value (FC) and the whiteness degree parameter (PL) of the resulting display device were measured to examine the relationship among the amount of addition of the gelling agent, the Y value and the whiteness degree. The spectral distribution curve of the display device was measured when the amount of addition of the gelling agent was set in a range from 0 to 4.5% by weight. The results of the measurements are shown in FIGS. 10(A) to 10(C).

Figure 10A:
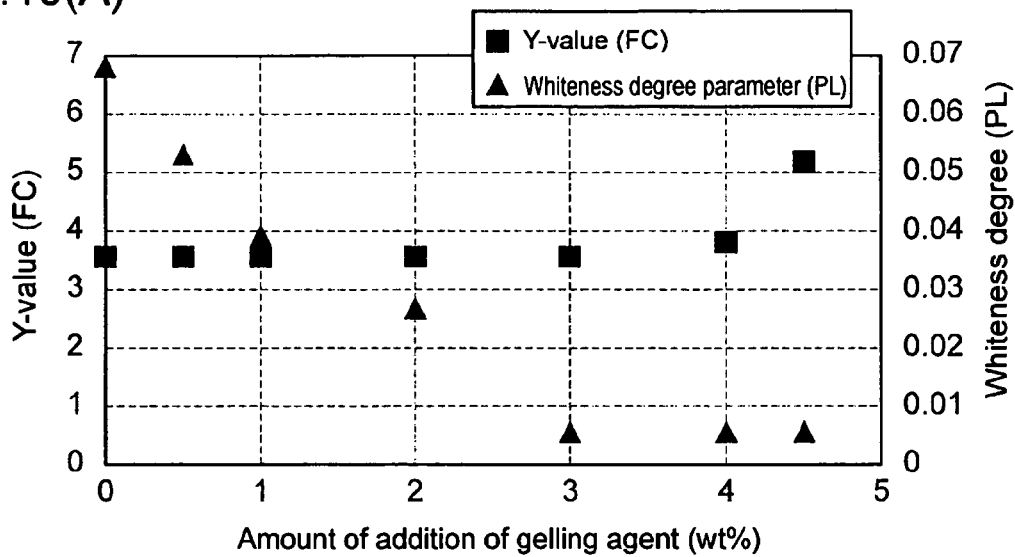
FIGS. 10A to 10C are graphs formed based upon example 3.
Figure 10B:
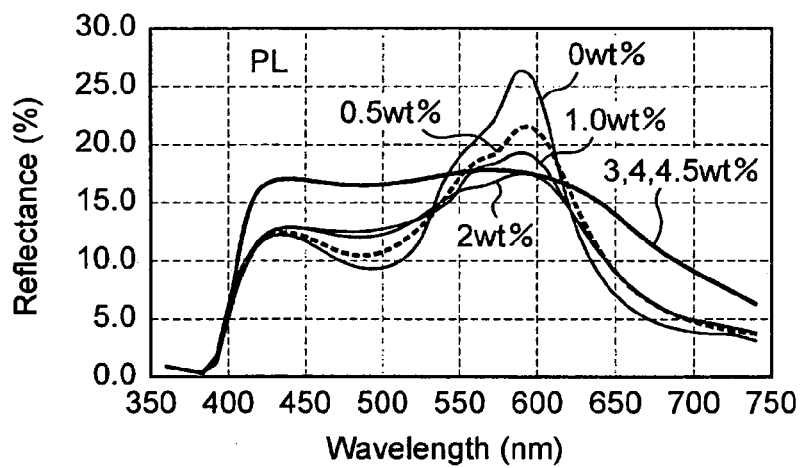
Figure 10C:
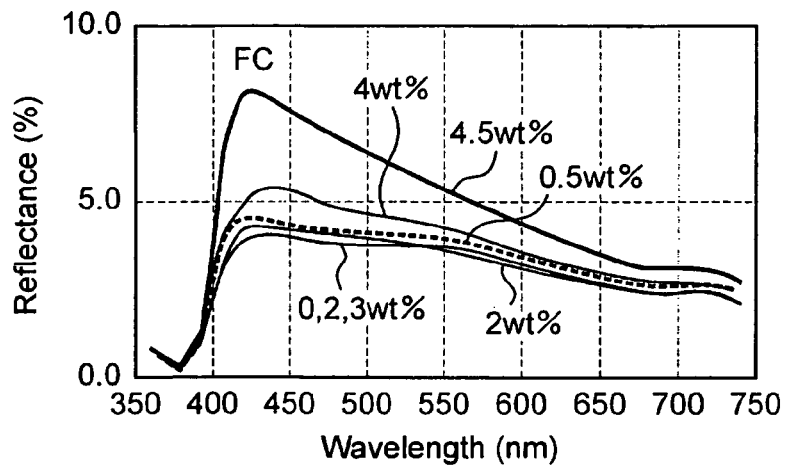

As shown in FIG. 10(A), the amount of addition of the gelling agent is preferably set in a range from 1.0 to 4.0% by weight from the relationship between the whiteness degree parameter (PL) and Y value (FC). In other words, when the amount of addition is less than 1.0% by weight, the whiteness degree parameter (PL) becomes greater, with the result that the resulting display might not be regarded as white. The amount of addition exceeding 4.0% by weight might cause a reduction in the contrast.

Experiment Example 4

Display Mode Dependence

The same method as example 1 was used, except that the mixed ratio of BL006 (made by Merck Ltd.) and CB15 (made by Merck Ltd.) in the chiral nematic liquid crystal composition was changed so that the peak wavelength of selective reflection in the spectral distribution curve of the resulting display device was set to 580 nm, that the amount of addition of the gelling agent was changed to 3% by weight, and that the cell gap was changed to 7.0 μm, to manufacture a display device.

The Y value (PL), Y value (FC) and Y value (Homeo) of the resulting display device were measured.

PL-FC Switching Mode:
Y value (PL)=17, Y value (FC)=5.22, with a memory property;

PL-Homeo Switching Mode:
Y value (PL)=17, Y value (Homeo)=0.673, without a memory property.

As shown above, by using the PL-FC mode, it becomes possible to provide a display with a sufficient contrast. Although the contrast is greatly improved by providing a display using the homeotropic-planar mode, no memory property is exerted. Thus, these modes may be used on demand depending on applications. These three modes may be switched with one another.

Figure 11A:
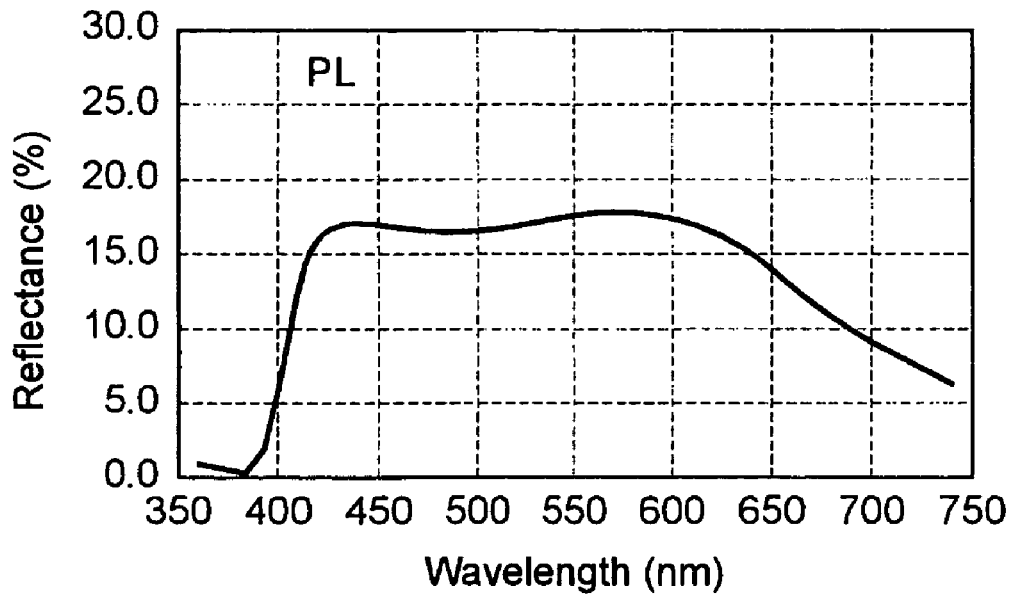
FIGS. 11A and 11B are graphs formed based upon example 4.
Figure 11B:
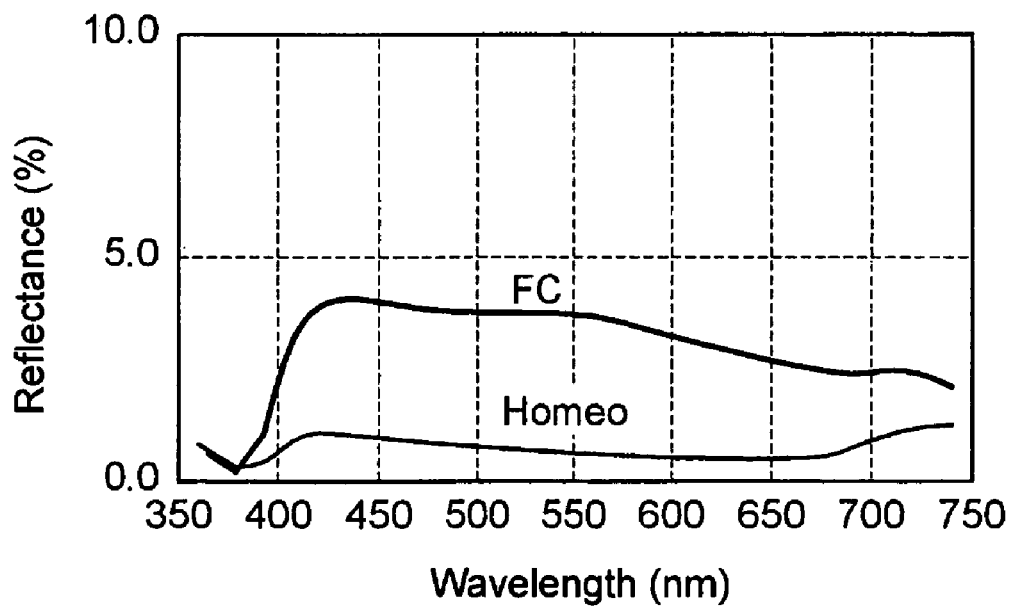

FIG. 11(A) and FIG. 11(B) show spectral distribution curves in the PL state, FC state and Homeo state.

Experiment Example 5

Liquid Crystal Dependence

Example 3

The same method as example 1 was used, except that the mixed ratio of BL006 (made by Merck Ltd.) and CB15 (made by Merck Ltd.) in the chiral nematic liquid crystal composition was changed so that the peak wavelength of selective reflection in the spectral distribution curve of the resulting display device was set to 580 nm, that the amount of addition of the gelling agent was changed to 3% by weight, and that the cell gap was changed to 7.0 μm, to manufacture a display device.

Comparative Example 2

The same method as example 3 was used, except that only the nematic liquid crystal BL006 (made by Merck Ltd.) was used without using the chiral agent, to manufacture a display device.

The resulting display device was used to provide a black-white display, and the Y value was measured at this time.

Example 3

Y value (PL)=17, Y value (Homeo)=0.673, without a memory property;

Comparative Example 2

Y value (PL)=8.6, Y value (Homeo)=0.673, without a memory property

As shown above, the application of chiral nematic liquid crystal makes it possible to increase the reflectance of white. This is presumably because selective reflection is added to scattering.

Figure 12A:
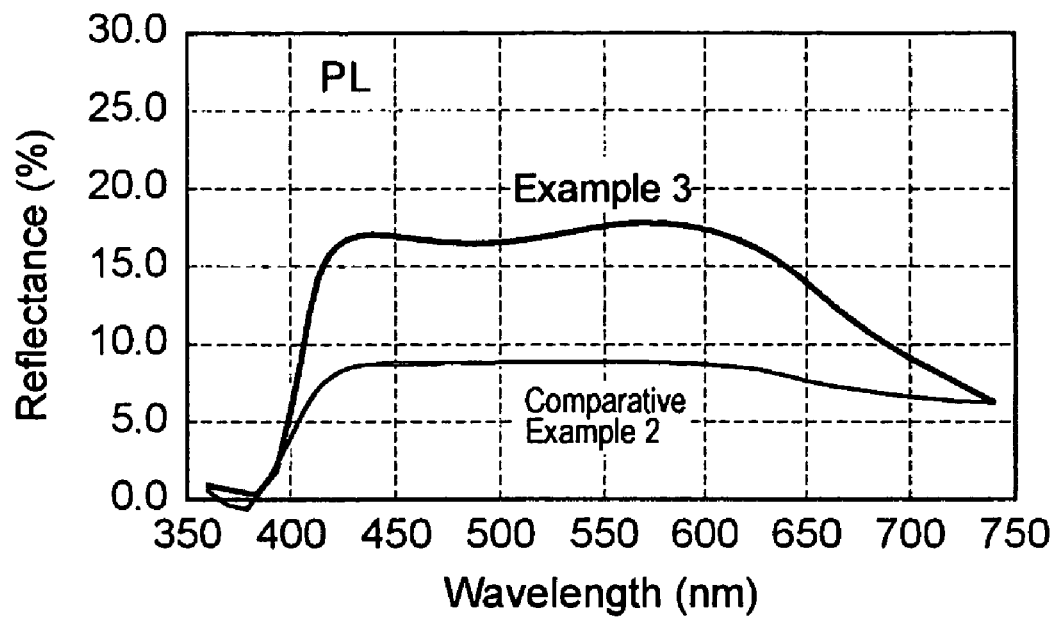
FIGS. 12A and 12B are graphs formed based upon example 5.
Figure 12B:
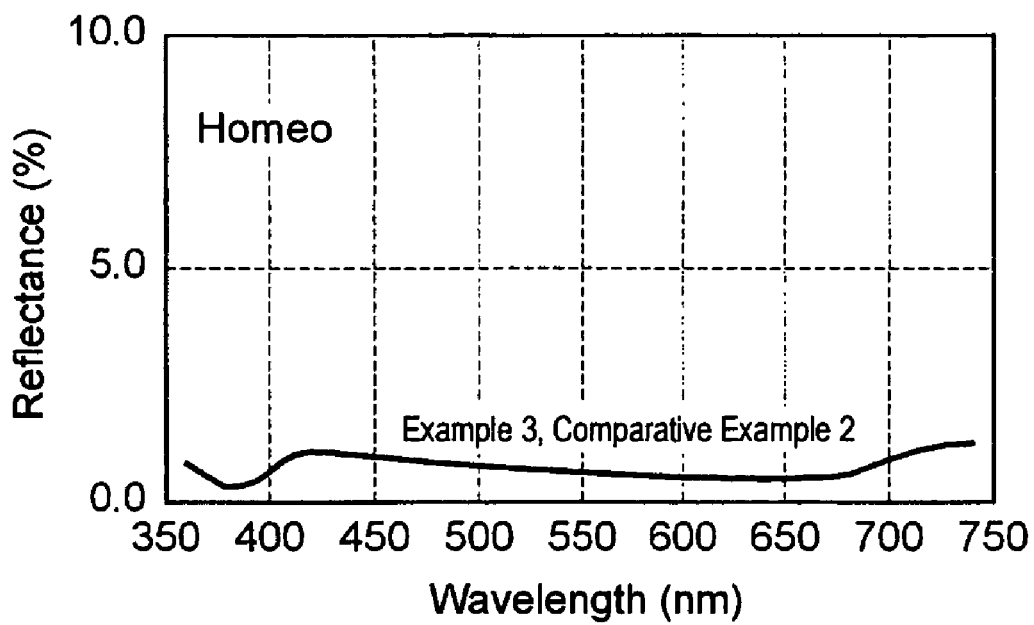

FIG. 12(A) and FIG. 12(B) show spectral distribution curves in the PL state, FC state and Homeo state.

Experiment Example 6

The amount of addition of the gelling agent is represented by a rate (weight %) of the gelling agent to the total amount of the nematic liquid crystal, the chiral agent and the gelling agent.

Example 4

The same method as example 1 was used except that BL006 (anisotropy of refractive index: 0.286, anisotropy of dielectric constant: 17.3, made by Merck Ltd.) was used as nematic liquid crystal, that CB15 (made by Merck Ltd.) was used as a chiral agent, that the mixed ratio of the nematic liquid crystal and the chiral agent was changed to 62:38 (weight ratio), that the amount of addition of the gelling agent was changed within a range from 0 to 4.5% by weight, and that the cell gap was changed to 6.0 μm, to manufacture a display device.

Example 5

The same method as example 1 was used except that BL032 (anisotropy of refractive index: 0.2484, anisotropy of dielectric constant: 15.4, made by Merck Ltd.) was used as nematic liquid crystal, that CB15 (made by Merck Ltd.) was used as a chiral agent, that the mixed ratio of the nematic liquid crystal and the chiral agent was changed to 62:38 (weight ratio), that the amount of addition of the gelling agent was changed within a range from 0 to 4.5% by weight, and that the cell gap was changed to 6.0 μm, to manufacture a display device.

Reference Example 1

The same method as example 1 was used except that BL004 (anisotropy of refractive index: 0.2240, anisotropy of dielectric constant: 15.6, made by Merck Ltd.) was used as nematic liquid crystal, that CB15 (made by Merck Ltd.) was used as a chiral agent, that the mixed ratio of the nematic liquid crystal and the chiral agent was changed to 62:38 (weight ratio), that the amount of addition of the gelling agent was changed within a range from 0 to 4.5% by weight, and that the cell gap was changed to 6.0 μm, to manufacture a display device.

Reference Example 2

The same method as example 1 was used except that BL006 (anisotropy of refractive index: 0.286, anisotropy of dielectric constant: 17.3, made by Merck Ltd.) was used as nematic liquid crystal, that CB15 (made by Merck Ltd.) was used as a chiral agent, that the mixed ratio of the nematic liquid crystal and the chiral agent was changed to 62:38 (weight ratio), that the amount of addition of the gelling agent was changed within a range from 0 to 4.5% by weight, that the cell gap was changed to 6.0 μm, and that a horizontal orientation film (made by JSR Corporation) was used as the orientation film, to manufacture a display device.

Figure 14A:
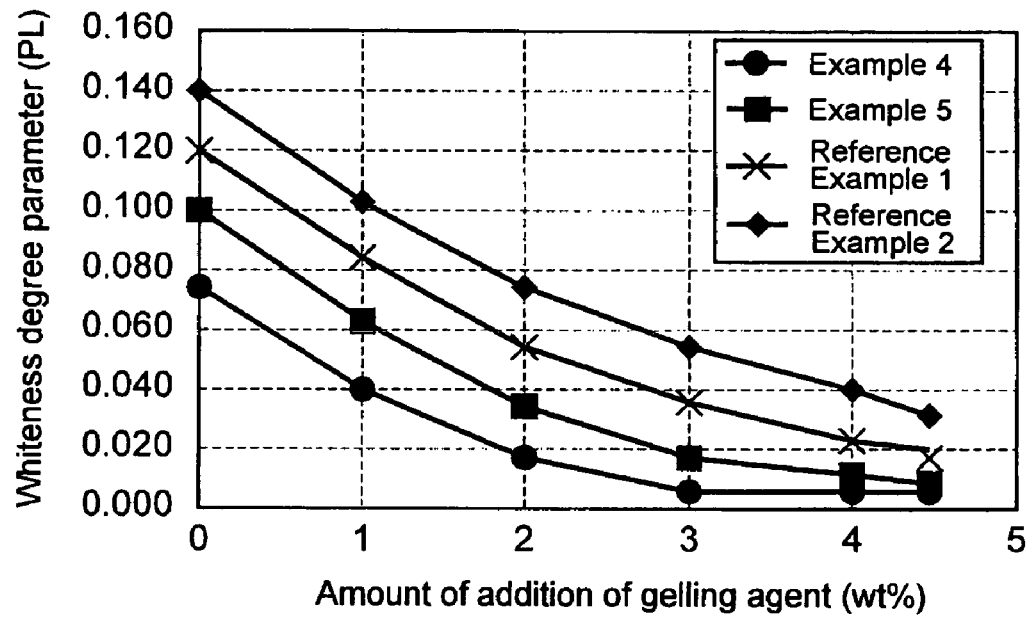
FIGS. 14A and 14B are graphs formed based upon example 6.
Figure 14B:
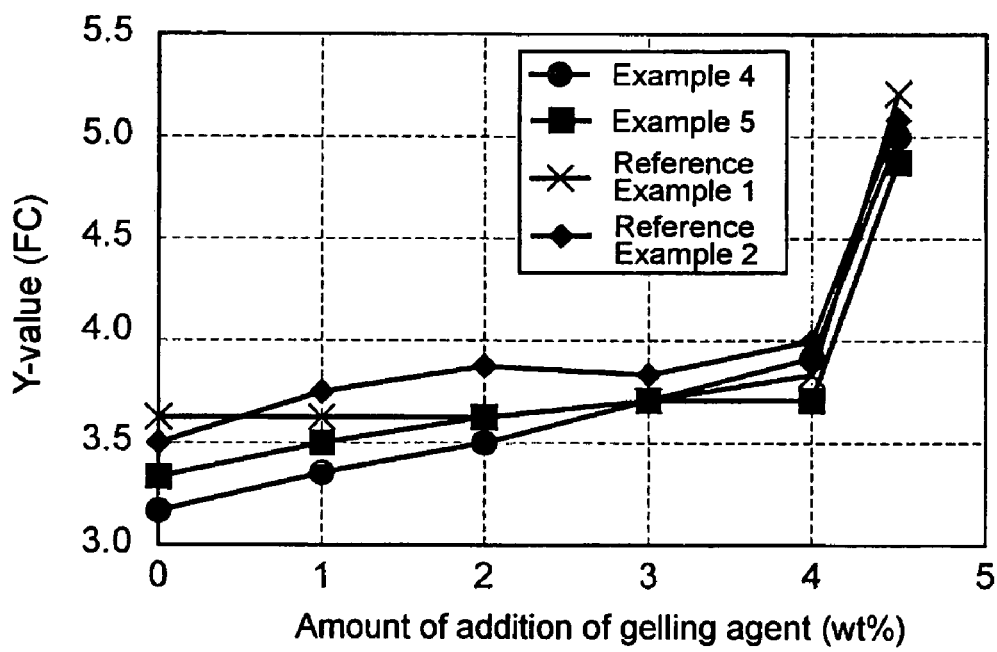

The Y value (FC) and whiteness degree parameter (PL) of each of the display devices obtained in the examples or reference examples were measured and the relationship among the amount of addition of the gelling agent, the Y value and the whiteness degree was examined. FIGS. 14(A) to 14(B) show the results of the measurements. Here, when the amount of addition of the gelling agent is 0% by weight, the spectral distribution curves were measured as shown below:

Example 4: $R_L$=23.95%, $R_S$=14.69%, $R_L \times 0.4 \leqq R_S$
Example 5: $R_L$=30.11%, $R_S$=12.10%, $R_L \times 0.4 \leqq R_S$
Reference Example 1: $R_L$=35.02%, $R_S$=9.11%, $R_L \times 0.4 > R_S$
Reference Example 2: No peak found in a range from not less than 400 nm to less than 500 nm.

An device, which has a predetermined spectral distribution curve in the planar state without containing a gelling agent, is allowed to effectively reduce its whiteness degree parameter upon addition of a gelling agent; therefore, the whiteness degree can be improved while the increase in the Y value (FC) due to the addition of the gelling agent is suppressed to the minimum (FIGS. 14(A) and 14(B)). Consequently, it is possible to easily achieve both of "whiteness" and "brightness (high contrast)" properties at the time of a PL display.

In example 1, both of the properties are achieved when the addition of the gelling agent is set in a range of 1 to 4% by weight. In particular, in the case when the addition of the gelling agent is set in a range from not less than 1% by weight to less than 2% by weight, since the heating process of the liquid crystal composition is not required upon manufacturing an device, the manufacturing process can be simplified.

In example 2, both of the properties are achieved when the addition of the gelling agent is set in a range of 1.8 to 4% by weight. In particular, in the case when the addition of the gelling agent is set in a range from not less than 1.8% by weight to less than 2% by weight, since the heating process of the liquid crystal composition is not required upon manufacturing an device, the manufacturing process can be simplified.

In reference example 1, both of the properties are achieved when the addition of the gelling agent is set in a range of 2.8 to 4% by weight.

In reference example 2, both of the properties are achieved when the addition of the gelling agent is set to 4% by weight.

What is claimed is:

1. A liquid crystal display device comprising:
    a liquid crystal layer comprising a cholesteric liquid crystal and a self-organizing gelling agent,
    wherein the content of the gelling agent is set in a range from 1.0 to 4.0% by weight with respect to the total amount of the cholesteric liquid crystal and the gelling agent, and
    wherein the liquid crystal layer is switched between a planar state and a focal conic state to provide a display.

2. The liquid crystal display device according to claim 1, wherein the liquid crystal layer shows white in the planar state and black in the focal conic state.

3. A liquid crystal display device comprising:
    a liquid crystal layer comprising a cholesteric liquid crystal and a self-organizing gelling agent,
    wherein the content of the gelling agent is set in a range from 1.0 to 4.0% by weight with respect to the total amount of the cholesteric liquid crystal and the gelling agent, and
    wherein the liquid crystal layer is switched between a planar state and a homeotropic state to provide a display.

4. The liquid crystal display device according to claim 3, wherein the liquid crystal layer shows white in the planar state and black in the homeotropic state.

5. A manufacturing method for a liquid crystal display device comprising:
    providing a cholesteric liquid crystal and a self-organizing gelling agent, the content of the gelling agent in a range from 1.0 to 4.0% by weight with respect to the total amount of the cholesteric liquid crystal and the gelling agent;
    spreading the cholesteric liquid crystal containing the gelling agent in a heated state over at least a first substrate to form a liquid crystal layer; and
    superposing a second substrate on the liquid crystal layer formed on the first substrate.

6. A manufacturing method for a liquid crystal display device comprising:
    providing a cholesteric liquid crystal containing a self-organizing gelling agent, the content of the gelling agent in a range from 1.0 to 4.0% by weight with respect to the total amount of the cholesteric liquid crystal and the gelling agent; and
    spreading the cholesteric liquid crystal that contains a gelling agent and exhibits flowability at room temperature over at least a first substrate to form a liquid crystal layer.

7. The manufacturing method according to claim 6 further comprising:
    superposing a second substrate on the liquid crystal layer formed on the first substrate.

8. A liquid crystal display device, comprising:
    a liquid crystal layer comprising a cholesteric liquid crystal and a self-organizing gelling agent, wherein:
    (a) the content of the gelling agent is set in a range from 1.0 to 4.0% by weight with respect to the total amount of the cholesteric liquid crystal and the gelling agent;
    (b) the spectral distribution curve of the cholesteric liquid crystal during the planar state satisfies the following conditions:
        (i) two or more peaks are included within a wavelength range from not less than 400 nm to not more than 700 nm;
        (ii) supposing that the maximum reflectance in a wavelength range from not less than 400 nm to not more than 500 nm is $R_S$ and that the maximum reflectance in a wavelength range from not less than 500 nm to less than 700 nm is $R_L$, the relationship of $R_L \times 0.4 \leqq R_S$ is satisfied.

* * * * *